United States Patent
Brosh

(10) Patent No.: US 11,839,201 B2
(45) Date of Patent: Dec. 12, 2023

(54) OPEN-SEA AQUACULTURE SYSTEM

(71) Applicant: SEA CONTROL HOLDINGS LTD., Zikhron Ya'akov (IL)

(72) Inventor: Shay Brosh, Zikhron Ya'akov (IL)

(73) Assignee: SEA CONTROL HOLDINGS LTD., Ya'akov (IL)

( * ) Notice: Subject to any disclaimer, the term of this patent is extended or adjusted under 35 U.S.C. 154(b) by 686 days.

(21) Appl. No.: 16/342,214

(22) PCT Filed: Oct. 18, 2017

(86) PCT No.: PCT/IL2017/051145
§ 371 (c)(1),
(2) Date: Apr. 16, 2019

(87) PCT Pub. No.: WO2018/073820
PCT Pub. Date: Apr. 26, 2018

(65) Prior Publication Data
US 2019/0239487 A1    Aug. 8, 2019

(30) Foreign Application Priority Data
Oct. 18, 2016    (IL) .......................................... 248383

(51) Int. Cl.
*A01K 61/60*    (2017.01)
*B63B 35/44*    (2006.01)

(52) U.S. Cl.
CPC .............. *A01K 61/60* (2017.01); *B63B 35/44* (2013.01); *B63B 2035/4493* (2013.01); *Y02A 40/81* (2018.01)

(58) Field of Classification Search
CPC ........ A01K 61/60; A01K 61/65; B63B 35/44; B63B 2035/4493; Y02A 40/81
(Continued)

(56) References Cited

U.S. PATENT DOCUMENTS 3,716,994 A    2/1973    Pogonowski
4,147,130 A    4/1979    Goguel
(Continued)

FOREIGN PATENT DOCUMENTS

CN    102232365    11/2011
CN    104363755    2/2015
(Continued)

OTHER PUBLICATIONS

International Search Report dated Feb. 15, 2018 for PCT Application No. PCT/IL2017/051145.
(Continued)

*Primary Examiner* — Tien Q Dinh
*Assistant Examiner* — Katelyn T Truong
(74) *Attorney, Agent, or Firm* — PEARL COHEN ZEDEK LATZER BARATZ LLP

(57) ABSTRACT

Open-sea aquaculture systems and methods are provided, which employ a semisubmersible platform with vertical columns, having storage and maintenance facilities for supporting aquaculture. Systems comprise a rigid assembly of aquaculture cages, with vertical cavities having forms configured to receive the corresponding vertical columns of the semisubmersible platform. The rigid assembly is mechanically connected to the semisubmersible platform in operational positions: (i) a raised position in which the rigid assembly encloses the corresponding vertical columns in the vertical cavities to limit a horizontal movement of the rigid assembly, and (ii) a lowered position in which the rigid assembly is below the corresponding vertical columns. Systems further comprise a control unit configured to control the mechanical position control mechanism to lower the rigid assembly upon occurrence of specified rough sea conditions, or whenever needed, and to raise the rigid assembly upon specified conditions.

15 Claims, 35 Drawing Sheets

(58) Field of Classification Search
USPC .......................................................... 119/223
See application file for complete search history.

(56) References Cited

U.S. PATENT DOCUMENTS

| | | | | |
|---|---|---|---|---|
| 5,329,719 | A * | 7/1994 | Holyoak | A01K 61/60 43/6.5 |
| 5,628,280 | A | 5/1997 | Ericsson | |
| 2005/0160999 | A1 | 7/2005 | Cortinas et al. | |
| 2006/0278154 | A1 * | 12/2006 | Towley, III | B63C 13/00 114/264 |
| 2009/0205554 | A1 * | 8/2009 | Srinivasan | B63B 39/00 114/264 |
| 2009/0235870 | A1 | 9/2009 | Troy | |
| 2013/0284105 | A1 * | 10/2013 | Han | A01K 61/60 119/230 |
| 2015/0083050 | A1 * | 3/2015 | Brosh | A01K 61/60 119/200 |
| 2017/0164587 | A1 * | 6/2017 | Humphrey | A01K 61/00 |
| 2017/0245479 | A1 * | 8/2017 | DePaola | B63B 35/38 |
| 2019/0239487 | A1 | 8/2019 | Brosh | |

FOREIGN PATENT DOCUMENTS

| | | |
|---|---|---|
| CN | 105994065 | 10/2016 |
| CN | 106020242 | 10/2016 |
| FR | 2665332 | 2/1992 |
| GB | 2501879 | 11/2013 |
| GB | 2501879 A | 11/2013 |
| JP | S47-021897 A | 10/1972 |
| JP | S52-117795 A | 10/1977 |
| JP | S6248328 A | 3/1987 |
| JP | H04-106966 U | 9/1992 |
| JP | H06-169671 A | 6/1994 |
| JP | H0799860 A | 4/1995 |
| JP | 2001-321011 A | 11/2001 |
| JP | 2005198641 | 7/2005 |
| JP | 2010-537882 A | 12/2010 |
| JP | 2015-515863 A | 4/2015 |
| KR | 20090067387 | 6/2009 |
| KR | 100963763 | 6/2010 |
| KR | 100963763 B1 | 6/2010 |
| KR | 101415103 B1 | 7/2014 |
| KR | 20150012282 A | 2/2015 |
| WO | WO2009032836 A1 | 3/2009 |
| WO | WO2013/168147 A | 11/2013 |
| WO | WO 2016/128981 | 8/2016 |

OTHER PUBLICATIONS

Search Report dated Mar. 26, 2020 for corresponding EP Application No. EP17862999.4.
Office Action for Chinese Patent Application No. 201780077557.7, dated Apr. 2, 2021.
Office Action for Japanese patent application No. 2019-520730, dated Sep. 28, 2021.
Office Action for BR patent application No. BR112019007923.8, dated Aug. 23, 2022.
Notice of Allowance for JP patent application No. 2019-520730, dated Apr. 5, 2022.
Office Action for AU patent application No. 2017345665, dated Oct. 17, 2022.

* cited by examiner

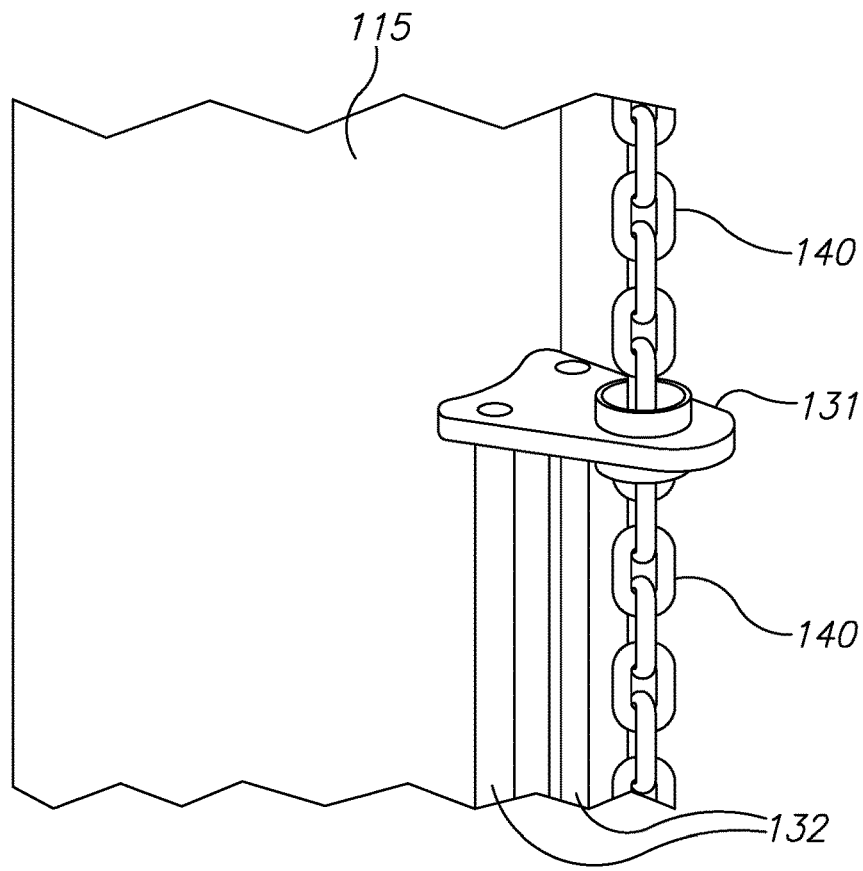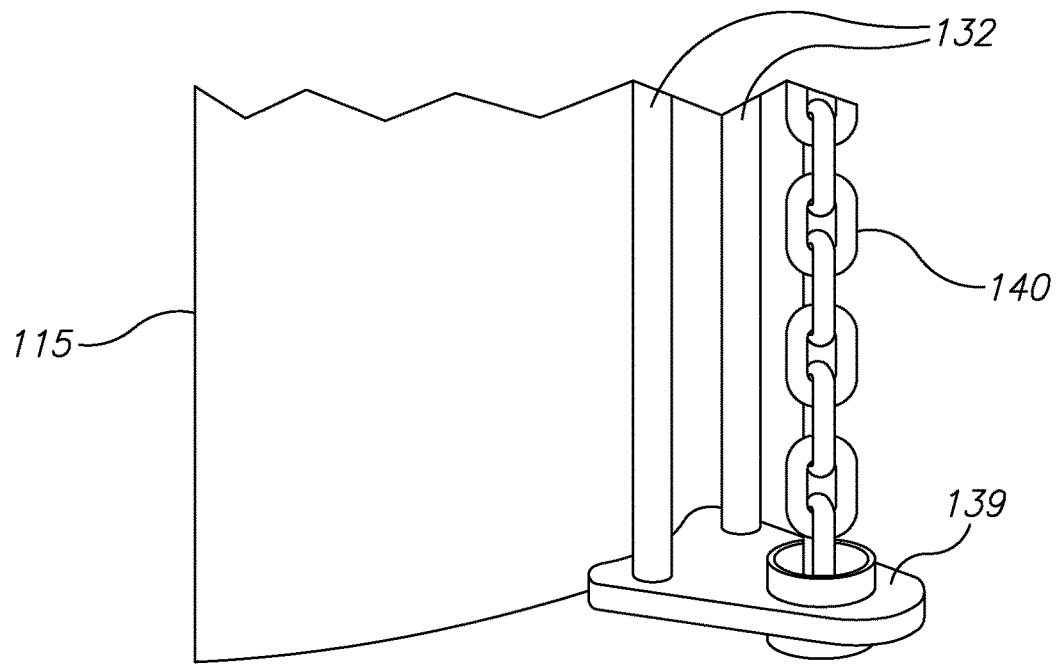
Figure 3B

VIEW "A-A"

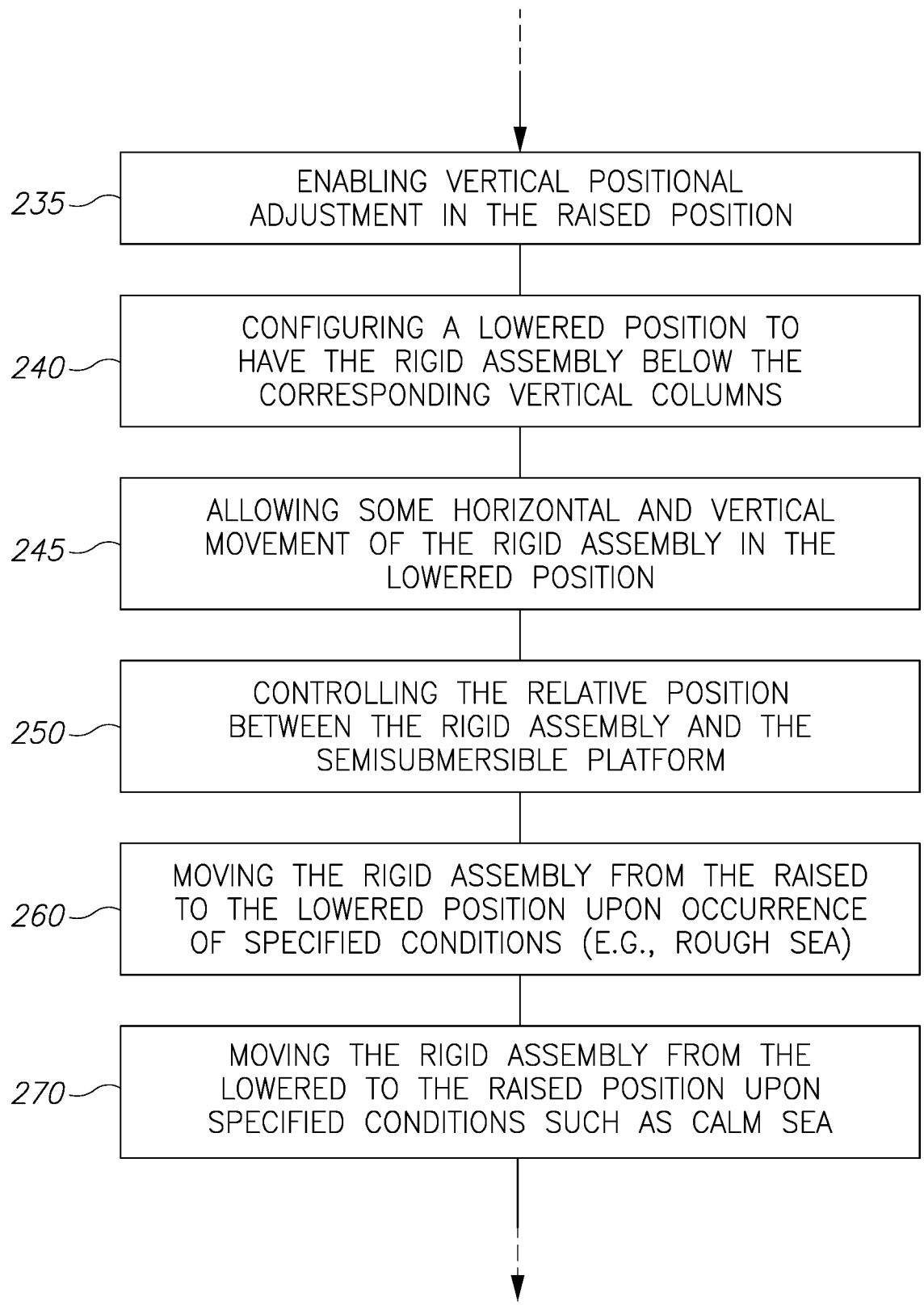
Figure 6 (cont. 1)

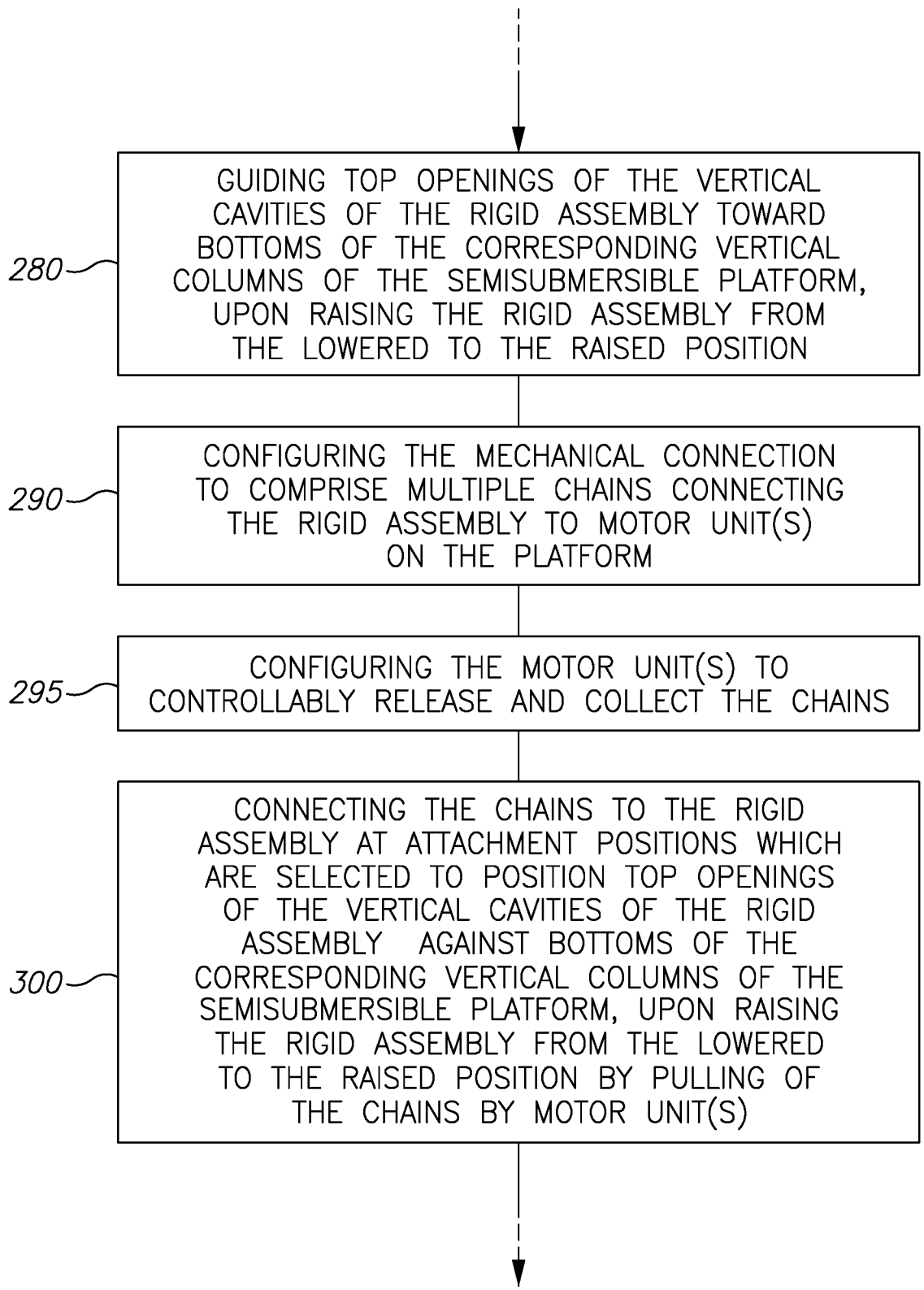
Figure 6 (cont. 2)

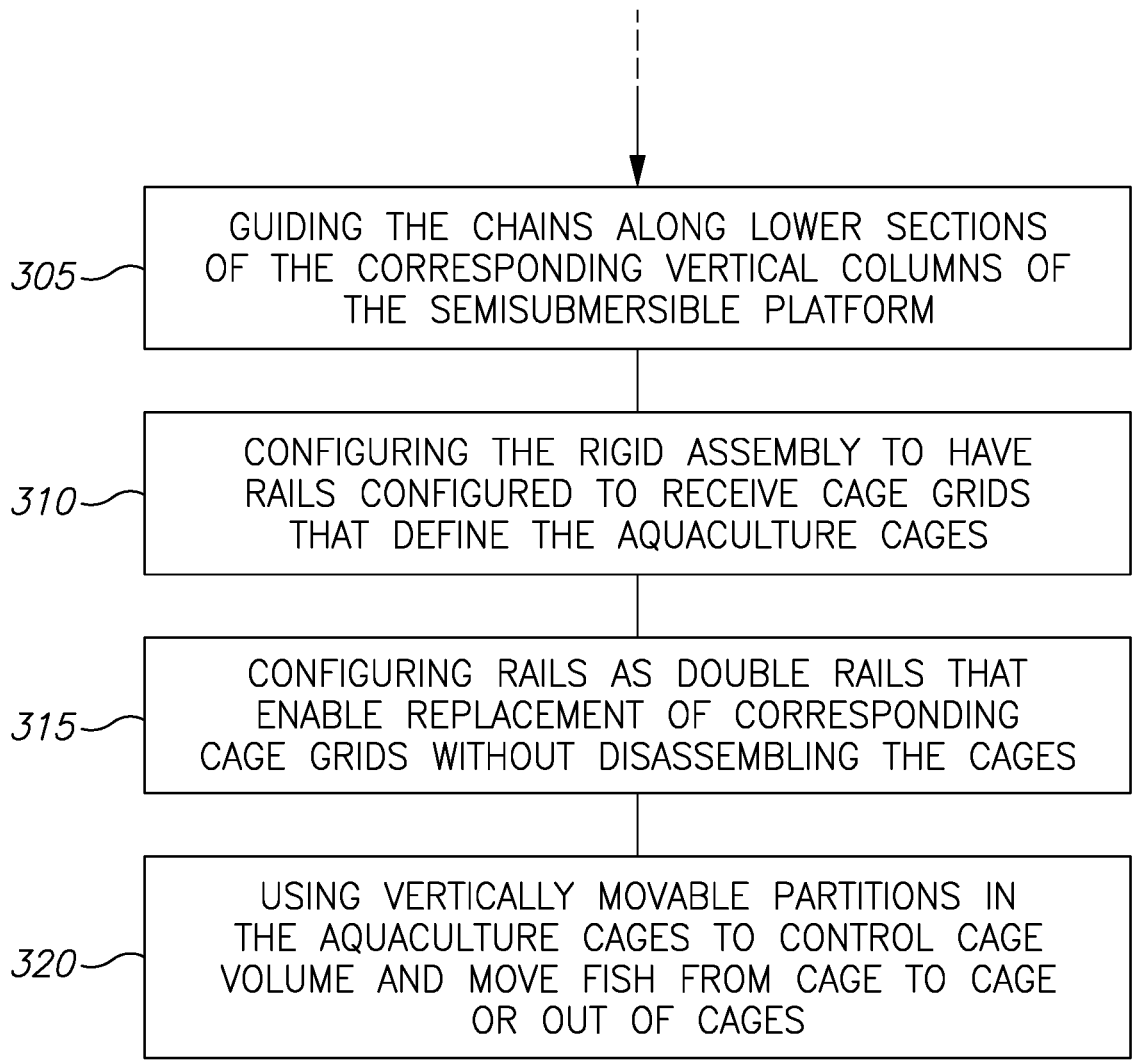
Figure 6 (cont. 3)

OPEN-SEA AQUACULTURE SYSTEM

CROSS-REFERENCE TO RELATED APPLICATIONS

This application is a National Phase Application of PCT International Application No. PCT/IL2017/051145, International Filing Date Oct. 18, 2017, claiming priority of Israeli Patent Application No. 248383 filed on Oct. 18, 2016, all of which are hereby incorporated by reference.

BACKGROUND OF THE INVENTION

1. Technical Field

The present invention relates to the field of aquaculture, and more particularly, to offshore aquaculture.

2. Discussion of Related Art

Offshore aquaculture is experiencing an expansion but has to cope with rougher sea conditions than the more traditional near-shore aquaculture.

U.K. Patent No. GB 2,501,879 which is incorporated herein by reference in its entirety, discloses an offshore aquaculture system based on a semisubmersible platform having storage and maintenance facilities for supporting aquaculture with an attached framework, to which net covered rigid aquaculture cages are movably connected and controllably positioned according to sea conditions. The cages may be lowered or raised with respect to the framework to protect the aquaculture products, and all maintenance and feeding is carried out by crew onboard the platform.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an open-sea aquaculture system comprising: a semisubmersible platform having storage and maintenance facilities for supporting aquaculture, the semisubmersible platform comprising a plurality of vertical columns, a rigid assembly of aquaculture cages, the rigid assembly comprising a plurality of vertical cavities having forms configured to receive corresponding vertical columns of the semisubmersible platform, a mechanical position control mechanism configured to connect, mechanically, the rigid assembly to the semisubmersible platform and control a relative position therebetween to provide at least two operational positions: (i) a raised position in which the rigid assembly encloses the corresponding vertical columns in the vertical cavities to limit a horizontal movement of the rigid assembly, and (ii) a lowered position in which the rigid assembly is below the corresponding vertical columns, and a control unit configured to control the mechanical position control mechanism to move the rigid assembly from the raised to the lowered position upon occurrence of specified rough sea conditions, or whenever needed, and to move the rigid assembly from the lowered to the raised position upon specified conditions.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
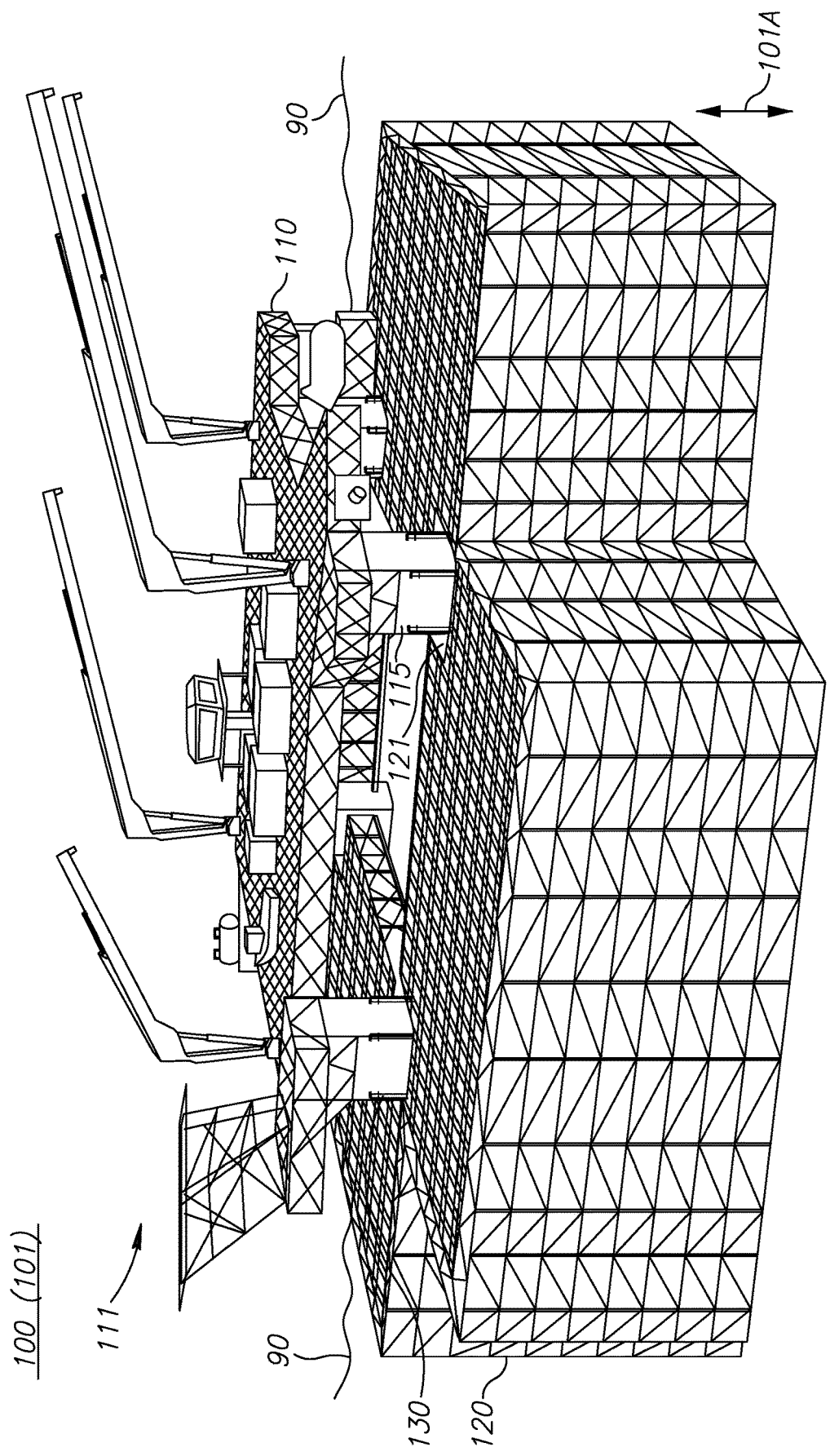
FIGS. 1A-1G are high level schematic illustrations of an open-sea aquaculture system, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Figure 1B:
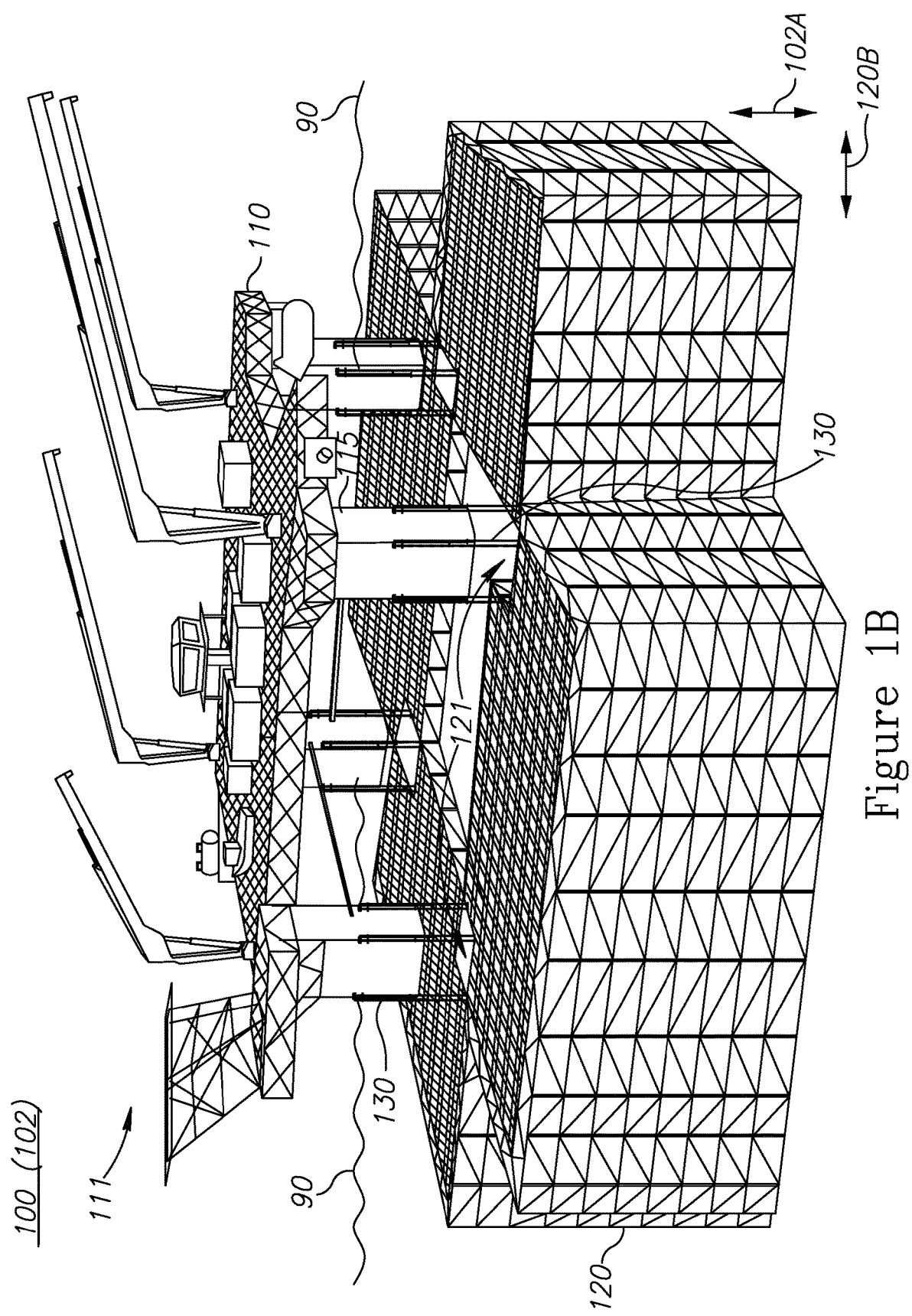
Figure 1C:
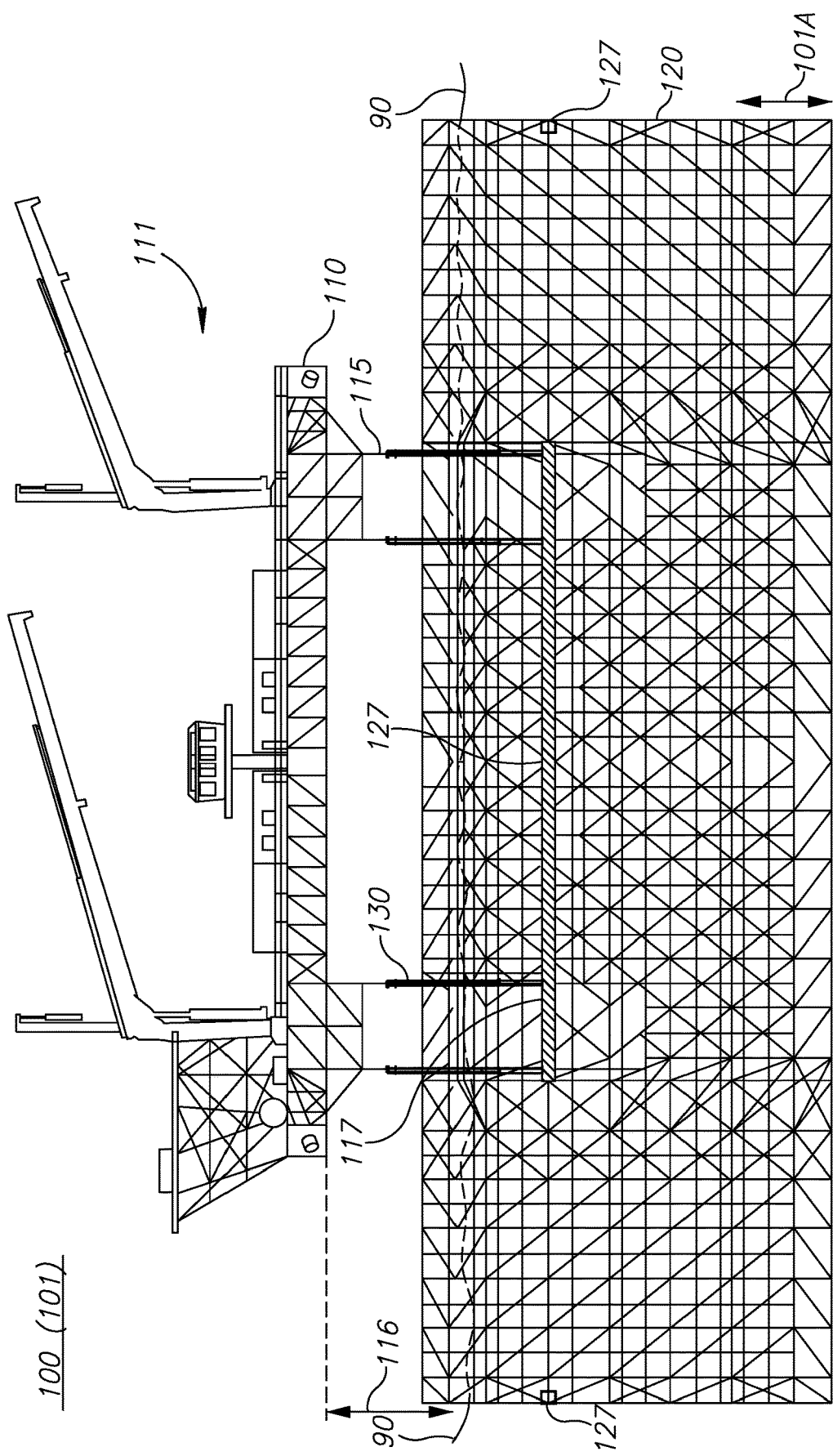
Figure 1D:
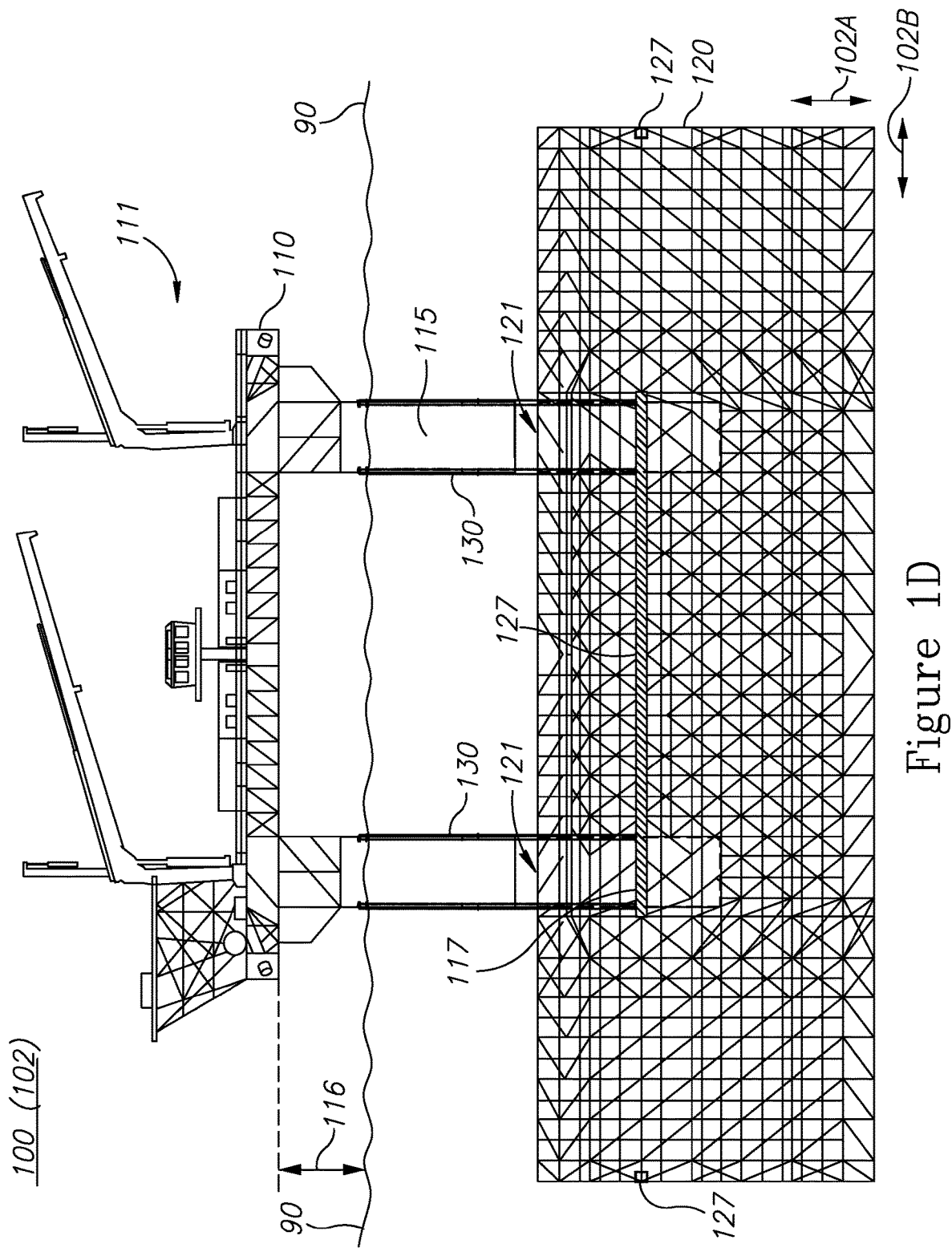
Figure 1E:
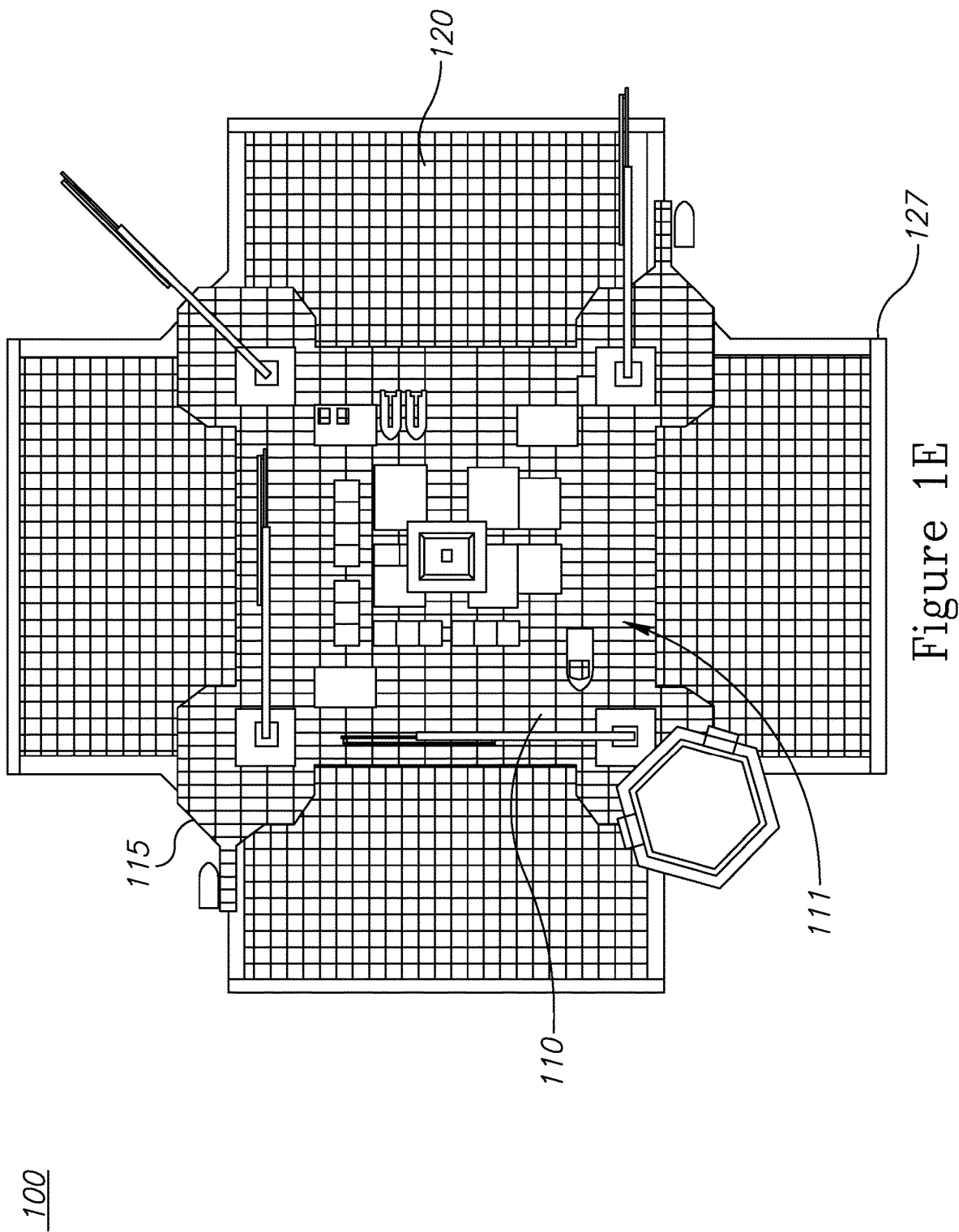
Figure 1F:
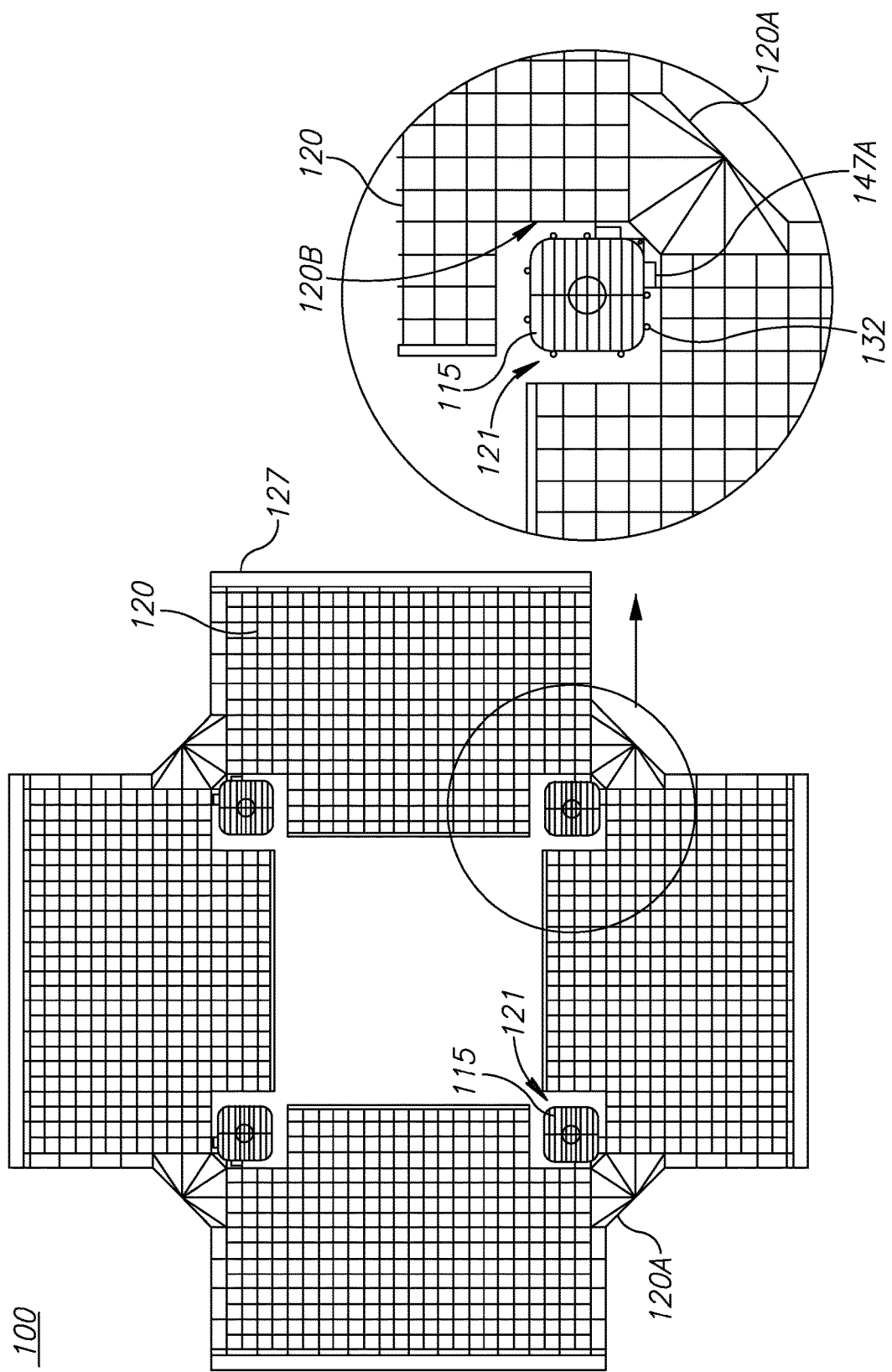
Figure 1G:
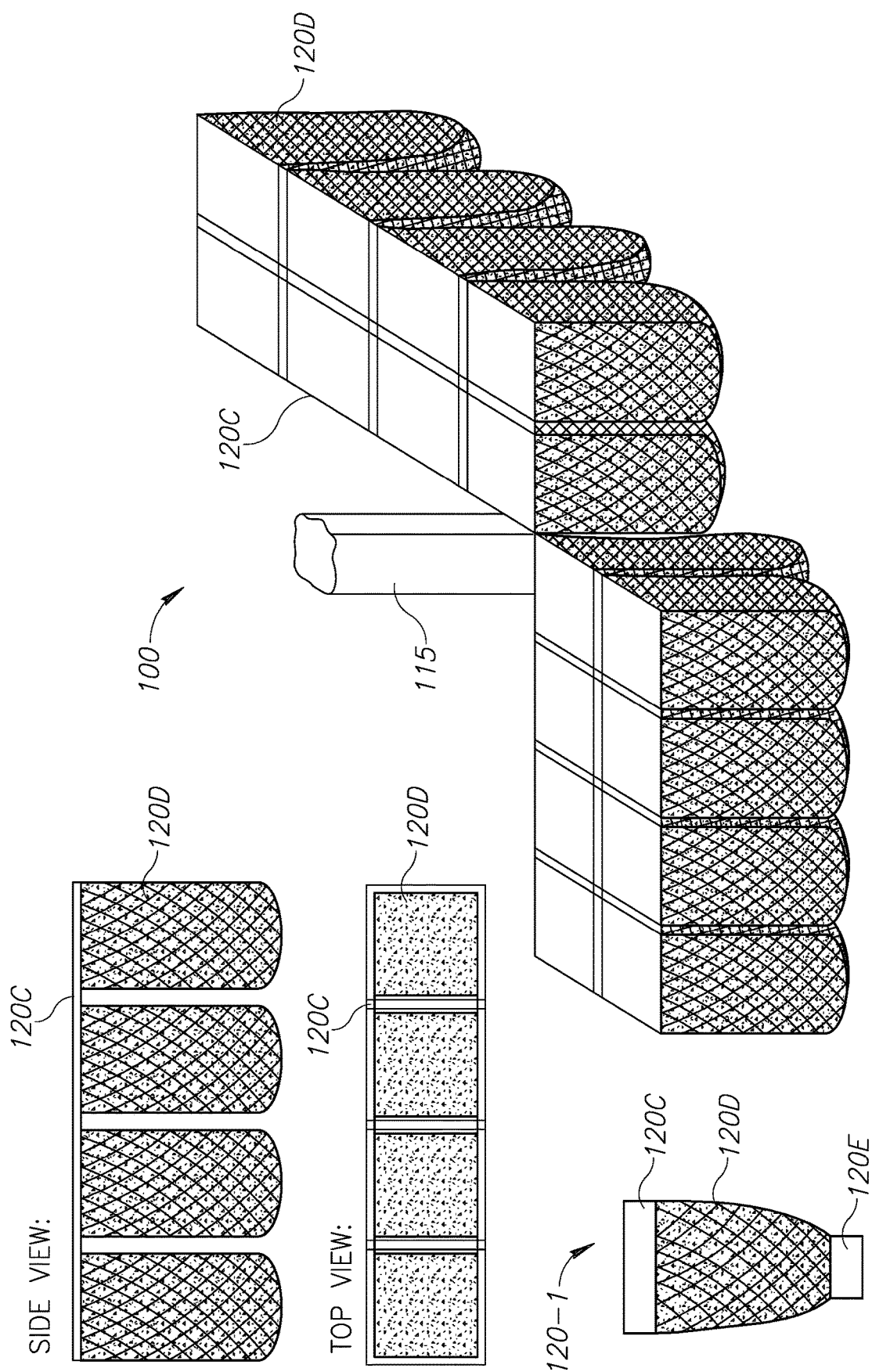
Figure 2A:
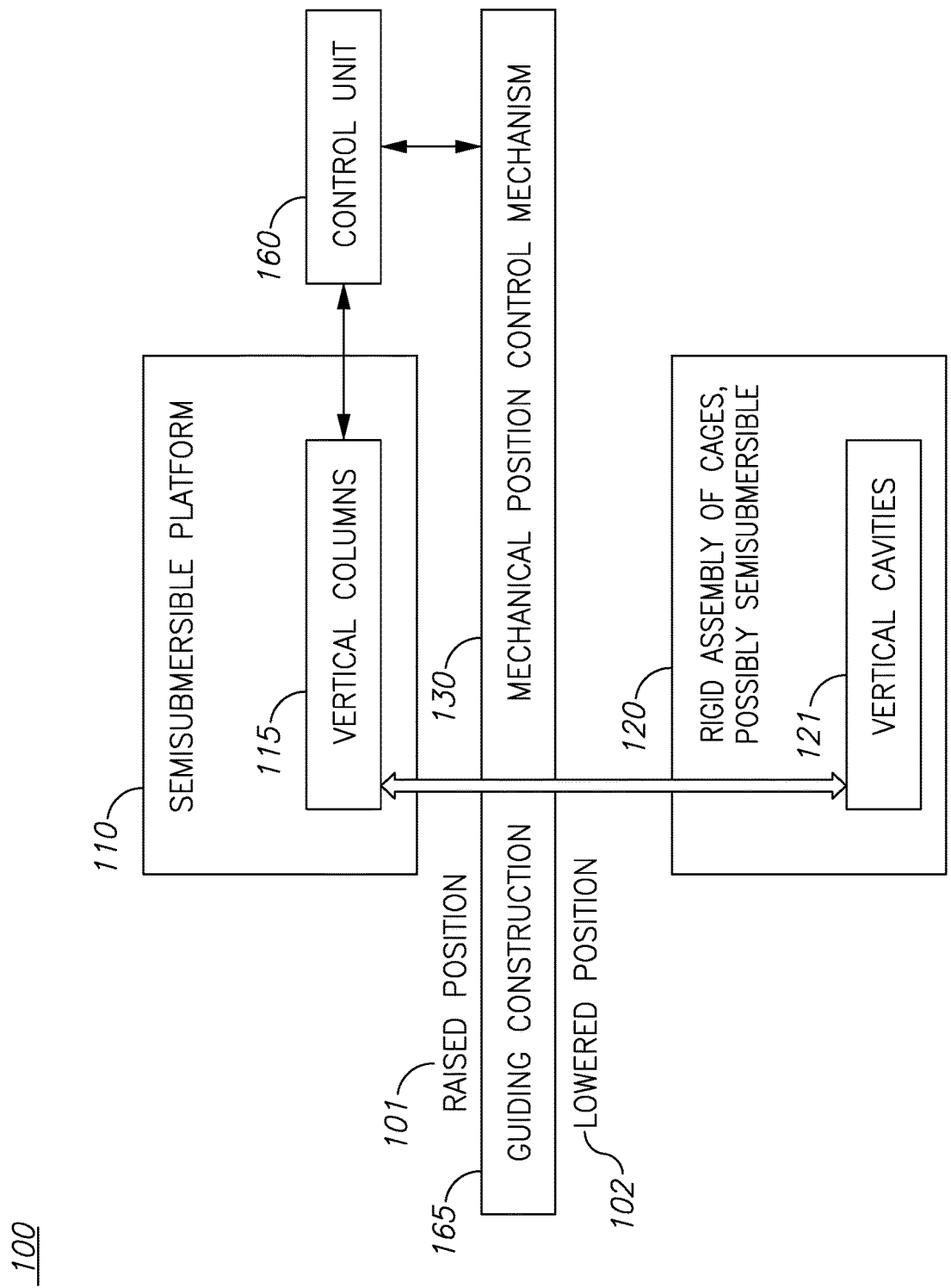
FIG. 2A is a high level schematic block diagram of the open-sea aquaculture system, according to some embodiments of the invention.
Figure 2B:
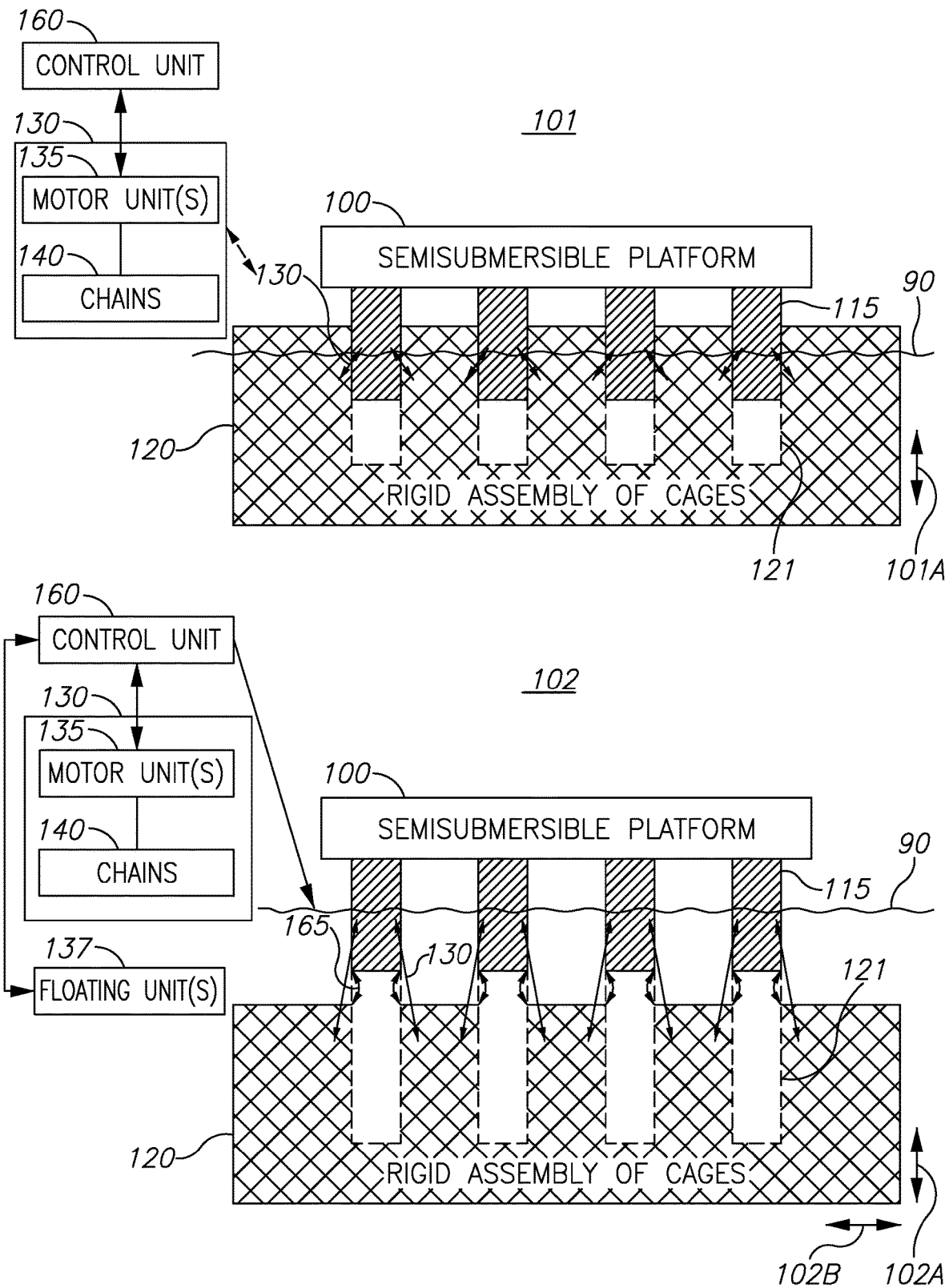
FIGS. 2B and 2C are a high level schematic illustration of positions and possible movements of the open-sea aquaculture system, according to some embodiments of the invention.
Figure 2C:
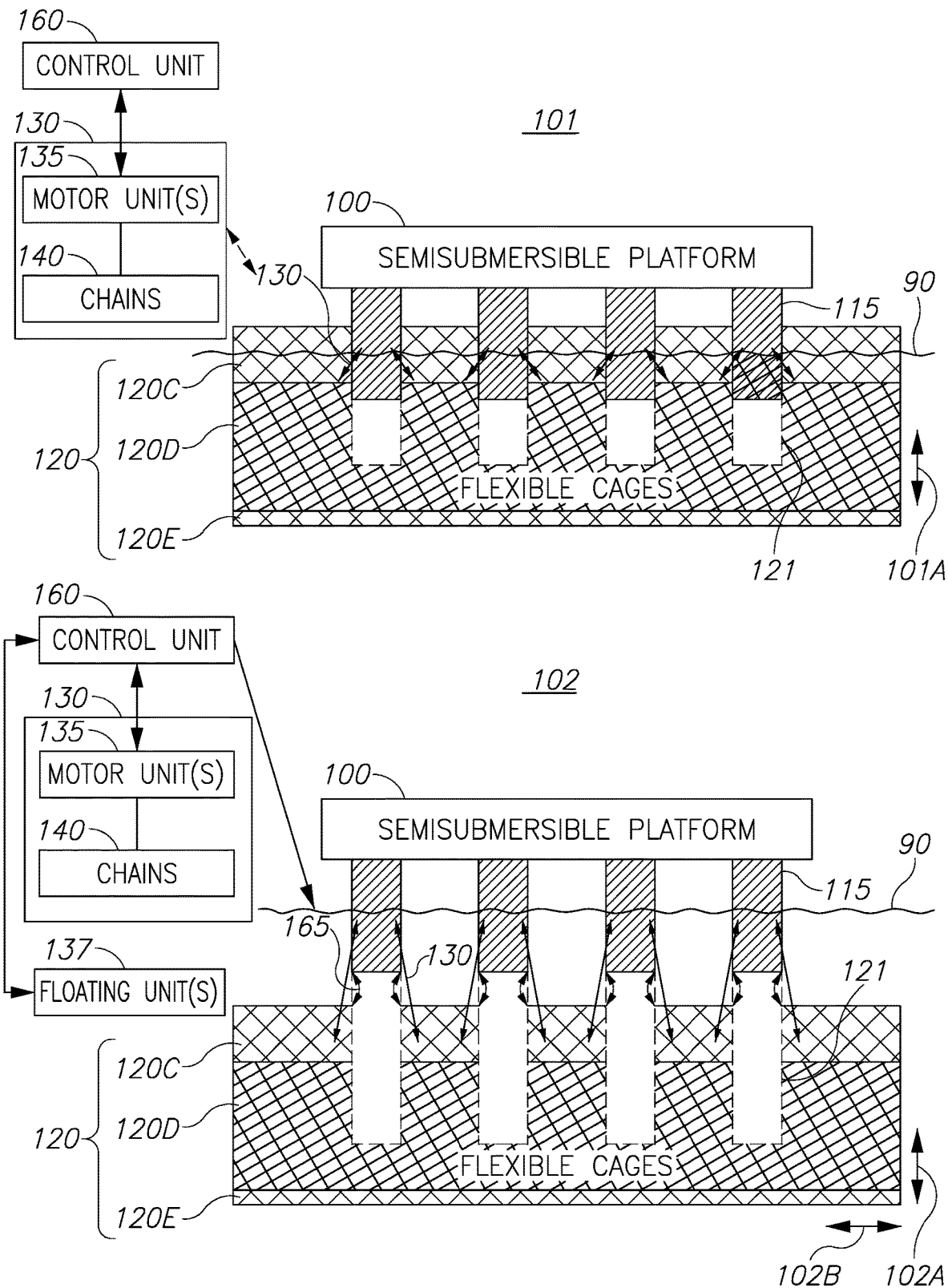

FIGS. 1A-1G are high level schematic illustrations of an open-sea aquaculture system 100, according to some embodiments of the invention. FIGS. 1A and 1B are perspective view, FIGS. 1C and 1D are side views, FIG. 1E is a top view and FIGS. 1F and 1G schematically illustrate columns and cages of system 100, FIG. 1F is a top view of a horizontal cross section below the sea level and FIG. 1G is a perspective view. Elements from FIGS. 1A-1G may be combined in any operable combination, and the illustration of certain elements in certain figures and not in others merely serves an explanatory purpose and is non-limiting. FIG. 2A is a high level schematic block diagram of open-sea aquaculture system 100, according to some embodiments of the invention, and FIGS. 2B and 2C are high level schematic illustrations of positions and possible movements of open-sea aquaculture system 100, according to some embodiments of the invention.

Open-sea aquaculture system 100 is configured to operate at a large distance from the shore and to enable a continuous operation of aquaculture at open-sea. Open-sea aquaculture system 100 comprises a semisubmersible platform 110, buoyant by its vertical columns 115 which are partly below ocean surface 90 (vertical columns 115 may be constructed as watertight pontoons). Semisubmersible platform 100 comprises an operating deck 111 having storage and maintenance facilities for supporting aquaculture and a plurality of vertical columns 115. Operating deck 111 is located stably high above (116) sea level 90 and is not or almost not affected by wave action under rough sea conditions. Open-sea aquaculture system 100 is configured to withstand long operation periods at sea.

Open-sea aquaculture system 100 further comprises a rigid assembly 120 of aquaculture cages 120A, 120B, etc. (see FIGS. 4A, 4D). Rigid assembly 120 may comprise at least part of buoyancy mechanisms 127 or be independent therefrom. Rigid assembly 120 comprises a plurality of vertical cavities 121 (see e.g., FIGS. 1A, 1F, 3A) having forms configured to receive corresponding vertical columns 115 of semisubmersible platform 110. It is noted that vertical columns 115 are understood as any structural element of semisubmersible platform 110 which crosses water level 90 and receives rigid cage assembly 120.

The dimensions and forms of rigid assembly 120 of aquaculture cages 120A, 120B, etc. are not limiting, in particular, rigid assembly 120 may extend far beyond the area of semisubmersible platform 110 to support a large number of cages, and may reach depths of several tens of meters. The cages themselves may be higher than wide, may be wider than high or may have similar height and width. The cages may be adapted to various types of aquaculture, e.g. fish, clams, ornamentals etc. The cages may be covered with nets (not shown) to maintain the cultured organisms within the cages. As shown in FIG. 1E, rigid cage assembly 120 may extend beyond the sides of platform 100 and extend horizontally and vertically according to required cage volumes. Rigid cage assembly 120 may enclose any water level crossing structures of platform 110, which are generally related here in a non-limiting manner as being vertical columns.

Buoyancy mechanisms 127 (e.g., floats or other buoyancy mechanism such as inflatable tubes, containers or other elements which may change their buoyancy under control of control unit 160) may be connected to rigid cage assembly 120 at various position, providing buoyancy for rigid cage assembly 120 and control over the buoyancy of rigid cage assembly 120, especially during raising and lowering rigid cage assembly 120.

Open-sea aquaculture system 100 comprises mechanical position control mechanism 130 (see FIGS. 1B, 1D) configured to connect, mechanically, rigid assembly 120 to semisubmersible platform 110, to limit a horizontal movements of rigid assembly 120, and to control a relative position therebetween to provide at least two operational positions: a raised position 101 (FIGS. 1A, 1C), in which rigid assembly 120 encloses corresponding vertical columns 115 in vertical cavities 121, and a lowered position 102 (FIGS. 1B, 1D) in which rigid assembly 120 is below corresponding vertical columns 115. Mechanical position control mechanism 130 is configured to raise and lower rigid assembly 120 to maintain a required position of the cages with respect to sea level. Mechanical position control mechanism 130 may be configured to enable adjustment 101A, 102A of the depth of rigid assembly 120 within each of raised position 101 and lowered position 102, respectively, to enable fine tuning of the cages' depth. It is noted that height 116 between operating deck 111 and sea level 90 is maintained in raised and lower positions 101, 102 of rigid assembly 120 and assures that operating deck 111 is located stably and is not or almost not affected by wave action under rough sea conditions.

In certain embodiments, sections of cages 120 may be reinforced by supports 120A, such as illustrated schematically in FIG. 1F. Vertical cavities 121 may be open at one or two points on their perimeter, or may be fully enclosed by cages 120. Vertical cavities 121 may be designed to be somewhat larger than the cross sections of vertical columns 115 and mechanical position control mechanism 130 may be configured to maintain vertical columns 115 within the volume of vertical cavities 121 and prevent an inner side 120B of cages 120 in vertical cavities 121 from contacting vertical columns 115 during the raising and lowering of cages and/or during regular operation of open-sea aquaculture system 100. Guiding elements 132, 147A may be set on either or both vertical columns 115 and inner sides 120B of vertical cavities 121 to protect either or both from possible impacts and/or to guide their relative movements, as explained in detail below.

In certain embodiments, cages 120 may be at least partially flexible and be made e.g., of flexible nets 120D, possibly held by one or more rigid cage parts 120C, 120E, as illustrated schematically in FIG. 1G in perspective, side and top views and in FIG. 2C as a schematic illustration. Mechanical position control mechanism 130 may be connected to at least one of rigid cage parts 120C, 120E to raise and lower cages 120.

Open-sea aquaculture system 100 further comprises a control unit 160 configured to control mechanical position control mechanism 130 to move rigid assembly 120 from raised to lowered position 101, 102, respectively, upon occurrence of specified rough sea conditions or operational requirements and to move rigid assembly 120 from lowered to raised position, 102, 101, respectively, upon specified conditions (FIGS. 2A-2C). Control unit 160 may be arranged to control mechanical position control mechanism 130 and to determine a depth of rigid assembly 120 with respect to sea level according to sea conditions or other operational requirements. Control unit 160 may comprise meteorological sensors and may be arranged to determine the optimal depth of rigid assembly 120 automatically with respect to measured and anticipated sea conditions, based on measurements from the meteorological sensors.

For example, regular operation under calm sea conditions may be carried out in raised position 101 while during storms (e.g., rough sea, high waves, strong currents etc.) rigid assembly 120 may be lowered to position 102 in which it is still connected to semisubmersible platform 110 but is maintained deeper in the sea and is allowed some horizontal movement 102B in response e.g., to strong current, to avoid damage to platform 110 by strong forces exerted on and by rigid assembly 120 under rough sea or strong currents conditions. The lowering of the cages reduces or prevents damage to the fish in them and also prevents application of mechanical forces between vertical columns 115 and cage assembly 120. Mechanical position control mechanism 130 is configured to be strong enough to maintain rigid assembly 120 connected to semisubmersible platform 110 while allowing some horizontal freedom of movement 102B. During calm sea periods, cage assembly 120 may be in raised position 101 according to the requirements for the grown organisms. The disclosed mechanisms and control patterns provide protection to the fish or other organisms that are cultured, yet require a relatively small interventional effort—cage assembly 120 does not have to be moved horizontally (in raised position 101), and no additional vessel and personnel are required for protecting or moving the cages. Moreover, the reaction times of control unit 160 are relatively short, as no intervention from shore is needed upon sea changes, and the sea conditions are measured at location (and not at shore) to provide most reliable data.

Floats 127 with buoyancy control of rigid cage assembly 120 may be part of mechanical position control mechanism 130, e.g., as a floating unit 137, and may be controlled by control unit 160 to support the raising and lowering of rigid cage assembly 120. Rigid cage assembly 120 may be semisubmersible by itself, with Floats 127 providing the buoyancy mechanism which may be controlled independently from and/or in relation to the buoyancy of semisubmersible platform 110. In certain embodiments, semisubmersible platform 110 and cages 120 may be independently semisubmersible sub-systems which are associated by mechanical position control mechanism 130, with vertical columns 115 and floats 127 providing the respective independent buoyancy mechanism (possibly with respective one or more control units controlling their buoyancy).

Open-sea aquaculture system 100 may further comprise a guiding construction 165 configured to guide rigid assembly 120 when moving from lowered position 102 to raised position 101, during the engagement of vertical columns 115 into vertical cavities 121. Guiding construction 165 may be at least partly integrated with mechanical position control mechanism 130, i.e., mechanical position control mechanism 130 may be configured to provide at least approximate proper positioning of vertical cavities 121 just below vertical columns 115 upon raising rigid assembly 120 from lowered position 102 to raised position 101 (see schematically in FIGS. 2B and 2C). Guiding construction 165 may be further configured to protect vertical columns 115 and/or vertical cavities 121 and cages 120 during raising and lowering cages and/or during operation of open-sea aquaculture system 100.

Mechanical position control mechanism 130 may comprise a plurality of chains 140 connecting rigid assembly 120 to at least one motor unit 135 on platform 110 which is configured to release and collect chains 140 under control of control unit 160. Motor unit(s) 135 may be electric, hydraulic or of any type applicable to the required forces. Motor unit(s) 135 may be replaced and/or assisted by crane(s) onboard semisubmersible platform 110.

Figure 3A:
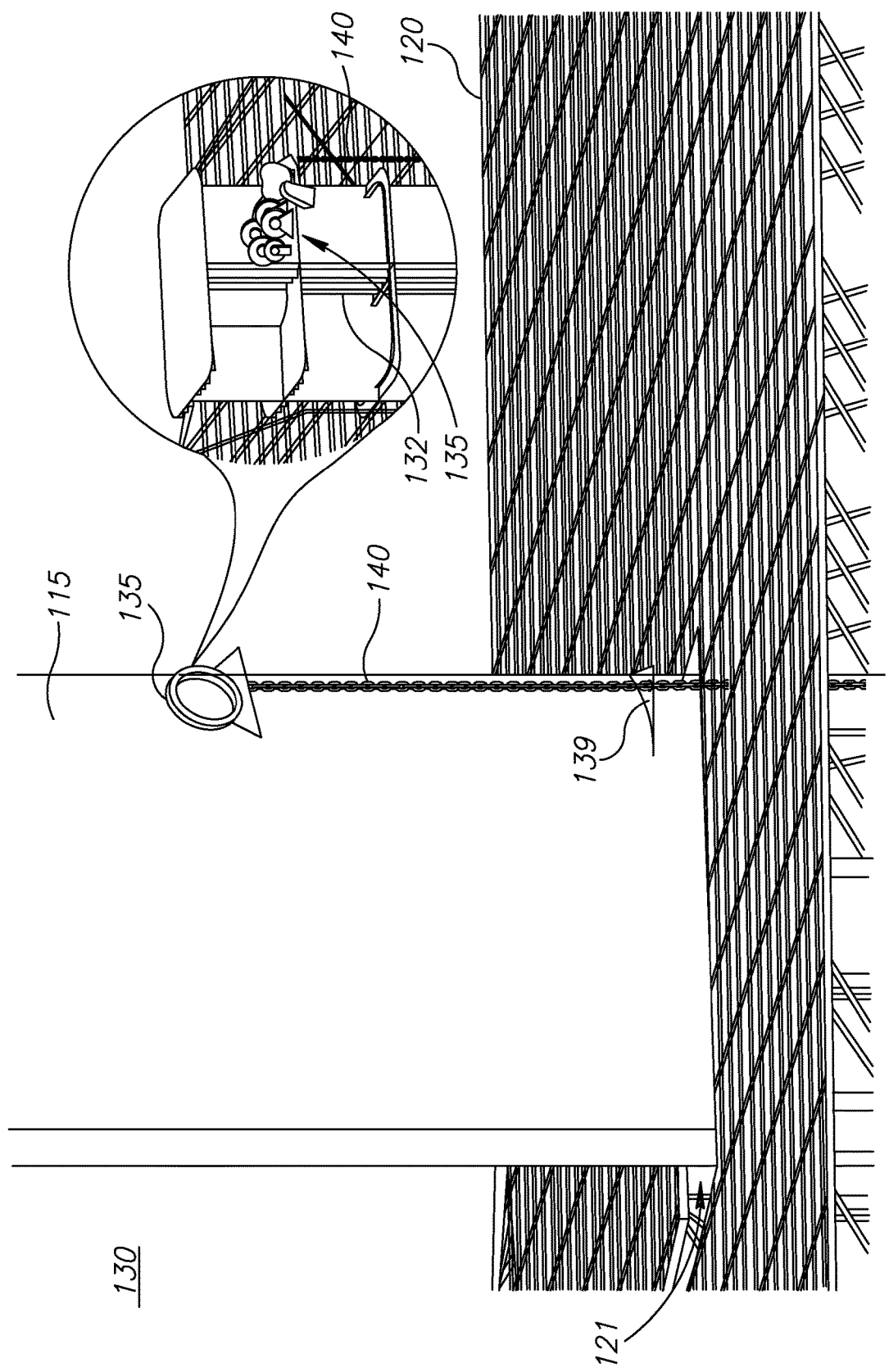
FIGS. 3A-3O are high level schematic illustrations of mechanical position control mechanisms in the open-sea aquaculture system, according to some embodiments of the invention.

FIGS. 3A-3O are high level schematic illustrations of mechanical position control mechanisms 130 in open-sea aquaculture system 100, according to some embodiments of the invention. Mechanical position control mechanism 130 may comprise a plurality of chains 140 connecting rigid assembly 120 to at least one motor unit 135 (including motor(s), pulley(s) etc., shown very schematically) on platform 110 (e.g., on vertical columns 115) which is configured to release and collect chains 140, controllably by control unit 160 (see FIGS. 2B, 2C). Guiding elements 132, 139 in various configurations (see non-limiting examples below) may be used to guide the relative motion of vertical columns 115 and vertical cavities 121 and prevent damaging them during operation of open-sea aquaculture system 100 at various sea conditions and operational requirements. Elements from FIGS. 3A-3G may be combined in any operable combination and operated within the context of any of the disclosed system configurations illustrated in FIGS. 1A-1G, 2A-2C, 4A-4D and 5. The illustration of certain elements in certain figures and not in others merely serves an explanatory purpose and is non-limiting.

Figure 3C:
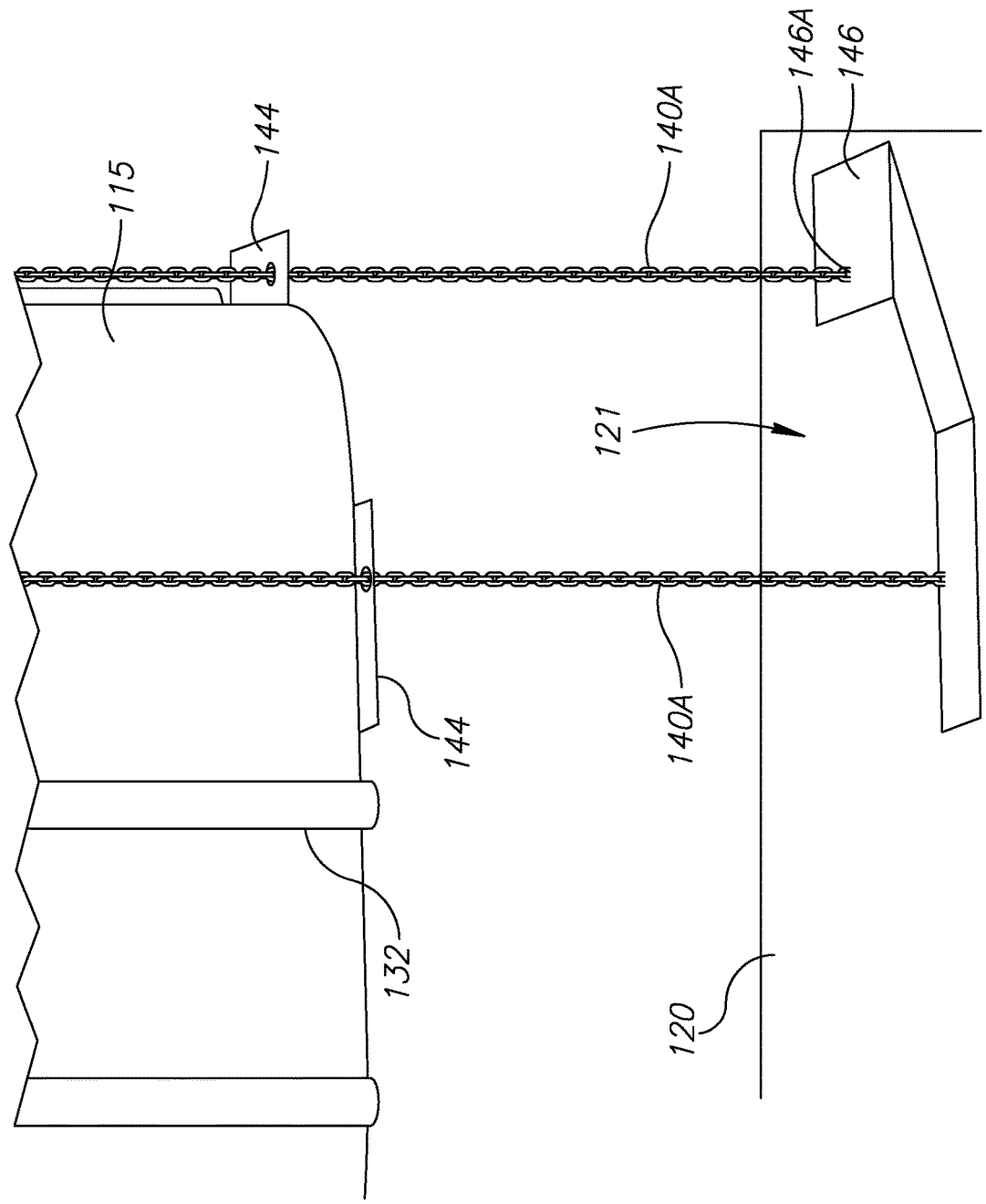
Figure 3D:
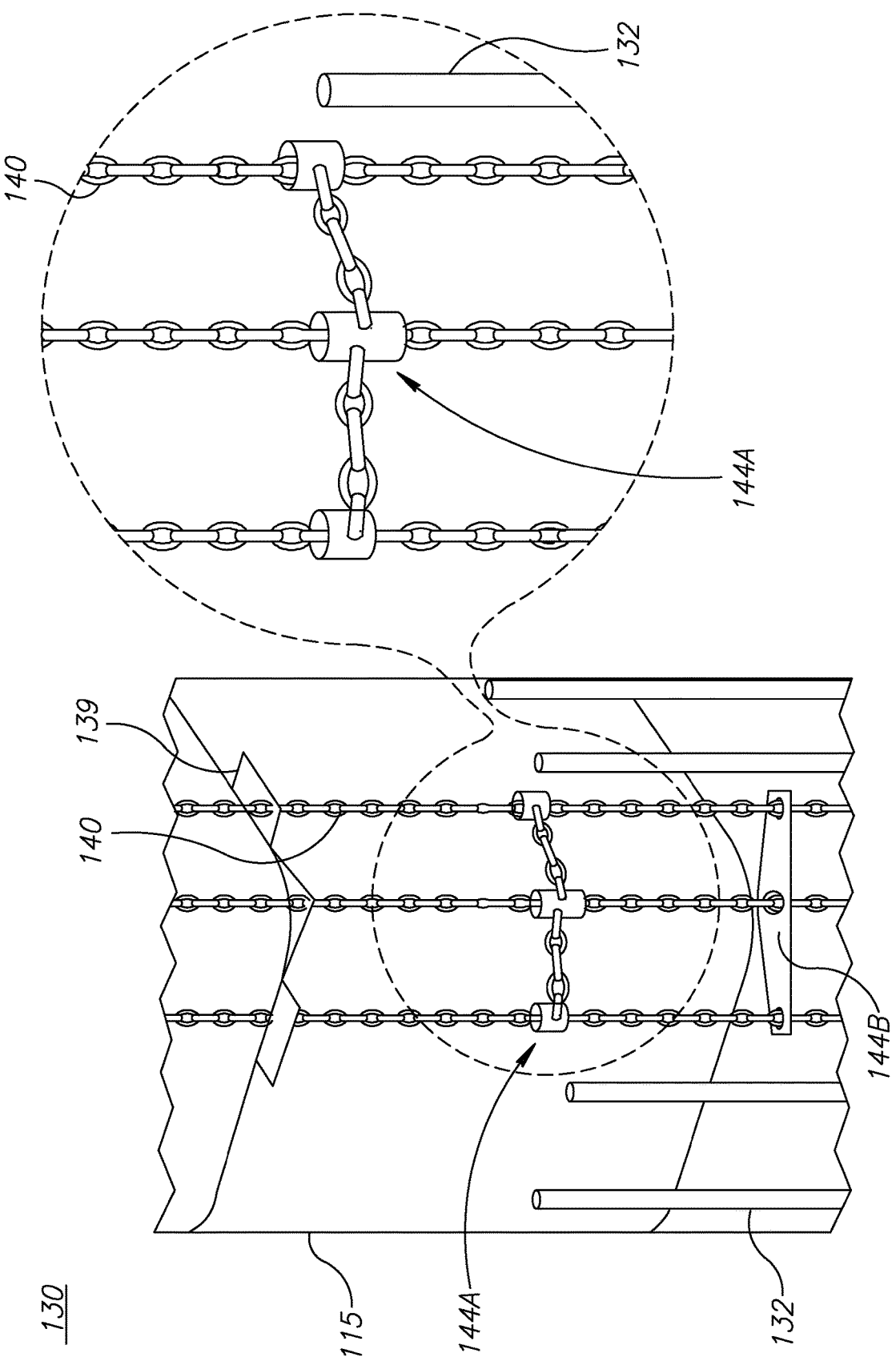
Figure 4A:
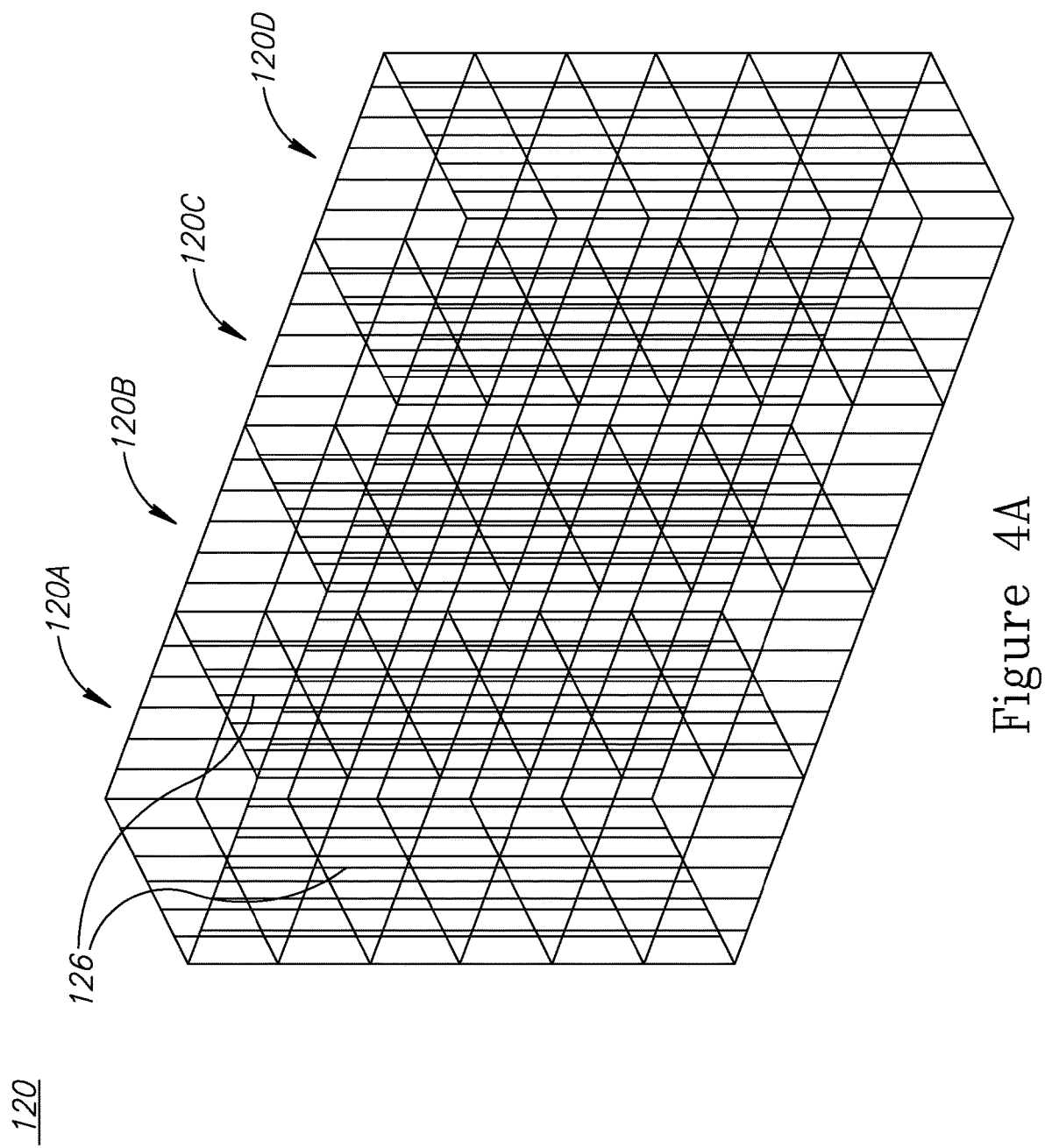
FIGS. 4A-4D are high level schematic illustrations of cage configurations in the rigid cage assembly, according to some embodiments of the invention
Figure 4B:
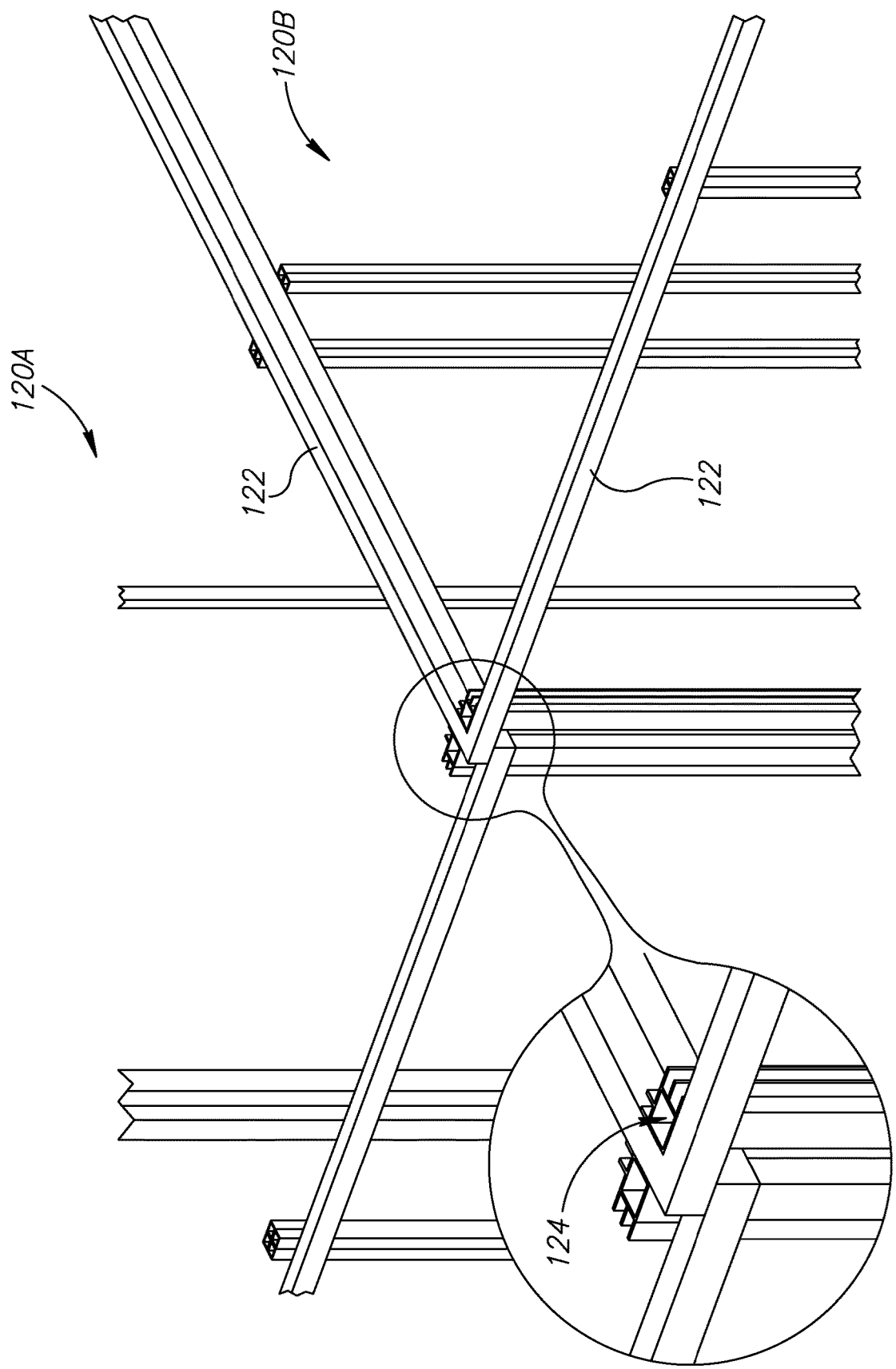

Chains 140 may be guided along vertical columns 115 by one or more guides 131, 139 (FIG. 3B). Chains 140 may be connected to rigid assembly 120 at a corresponding plurality of attachment positions 146A, possibly stabilized and supported by additional connection structures 146 (FIG. 3C). Attachment positions 146A may be selected to position the top openings of vertical cavities 121 of rigid assembly 120 against the bottoms of corresponding vertical columns 115 of semisubmersible platform 110, upon raising rigid assembly 120 from lowered to raised position 102, 101 respectively, by pulling chains 140 by motor unit(s) 135.

Chains 140 may be guided along at least lower sections of corresponding vertical columns 115 of semisubmersible platform 110, e.g., by top and bottom guiding elements 131, 139, respectively (FIG. 3B) to control chain movement and direction of forces conveyed by chains. Chains 140 may be guided in parallel along vertical columns 115 and may be stabilized by connecting and/or guiding members 144A, 144B (FIGS. 3D, 3E) and/or chains 140 may be guided together along vertical columns 115 and then split to multiple chains 140A (FIG. 3F) before connecting to rigid assembly 120.

Open-sea aquaculture system 100 may further comprise guiding construction 165 (shown schematically in FIG. 2A and implemented using various members in FIGS. 3A-3O, such as members 144A, 144B, 146 etc.). Guiding construction 165 may be configured to guide top openings of vertical cavities 121 of rigid assembly 120 toward bottoms of corresponding vertical columns 115 of semisubmersible platform 110, upon raising rigid assembly 120 from lowered to raised position 102, 101, respectively (see a schematic explanation in FIG. 3K and various embodiments in FIGS.

3A-3O). Guiding construction 165 may comprise multiple members, arranged geometrically and with respect to applied forces in a way that brings the top openings of vertical cavities 121 into the correct position below the bottoms of corresponding vertical columns 115 upon pulling chains 140 upwards by motor unit(s) 135 (see a schematic explanation in FIG. 3K and various embodiments in FIGS. 3A-3O). For example, guiding construction 165 may comprise the configuration of chains 140A, connection structures 146 connecting chains 140A to rigid cage assembly 120, top and bottom guiding elements 131, 139 and edge guiding elements 144 on vertical columns 115, as well as guiding elements 132 on vertical columns 115 and possibly on the inner sides of cavities 121 (not shown), configured to absorb mechanical shocks and guide the moving rigid cage assembly 120 up and down along vertical columns 115 in vertical movement 101A (see also FIGS. 3B and 3C). Guiding construction 165 may be configured to balance forces operating sideways during the raising and lowering of cages 120 to reduce or prevent lateral movement of cages 120 with respect to columns 115 and keep vertical columns 115 more or less centrally within vertical cavities 121 and prevent mutual impacts of vertical columns 115 and inner sides 120B of cages 120 in vertical cavities 121.

Figure 3E:
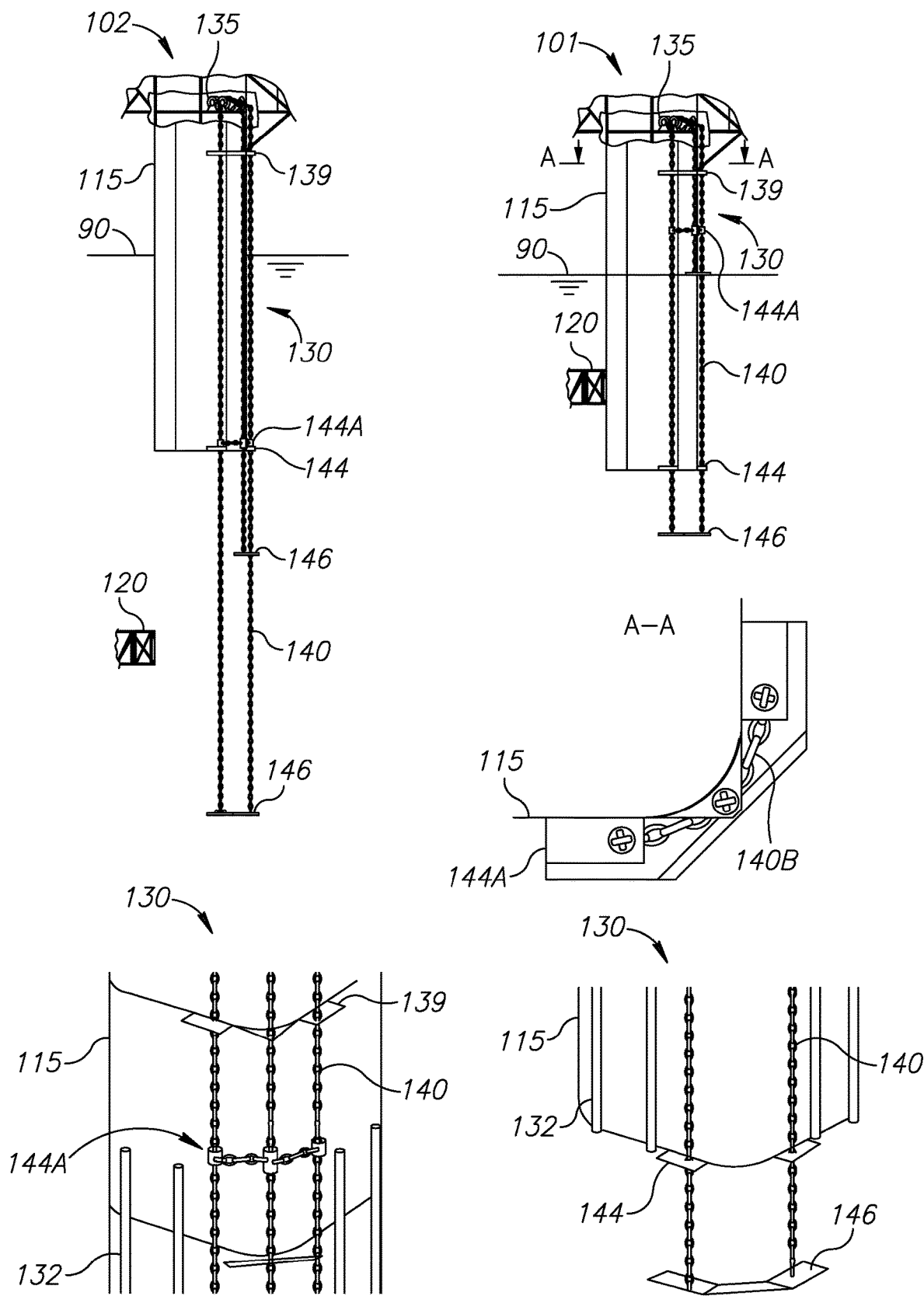

FIG. 3E schematically illustrates mechanical position control mechanism 130, according to some embodiments of the invention. FIG. 3E schematically illustrates mechanical position control mechanism 130 on one of columns 115 in lowered position 102 and in raised position 101 in side view, as well as details of guiding elements in mechanical position control mechanism 130. Mechanical position control mechanism 130 may comprise parallel chains 140, guided along vertical columns 115 (e.g., by guiding elements 139, 144, 144A), e.g., along edges of columns 115. Guiding elements 139, 144 and/or 144A may be configured to stabilize chains 140 and maintain their parallel configuration during operation of mechanical position control mechanism 130. In particular guiding element(s) 144A shown in detail in cross section of column 115 may be configured to maintain a relative position of the chains 140, minimize the horizontal movements of rigid cage assembly 120 and/or minimize the relative motion between cage assembly 120 and vertical columns 115, as explained below in more details. Parallel chains 140 may be connected to rigid cage assembly 120 via connection structures 146 at different heights along rigid cage assembly 120, selected to assure the stability of rigid cage assembly 120 in lowered position 102 and simplify the raising of rigid cage assembly 120 from lowered position 102 to raised position 101, with cavities 121 enclosing columns 115.

Figure 3F:
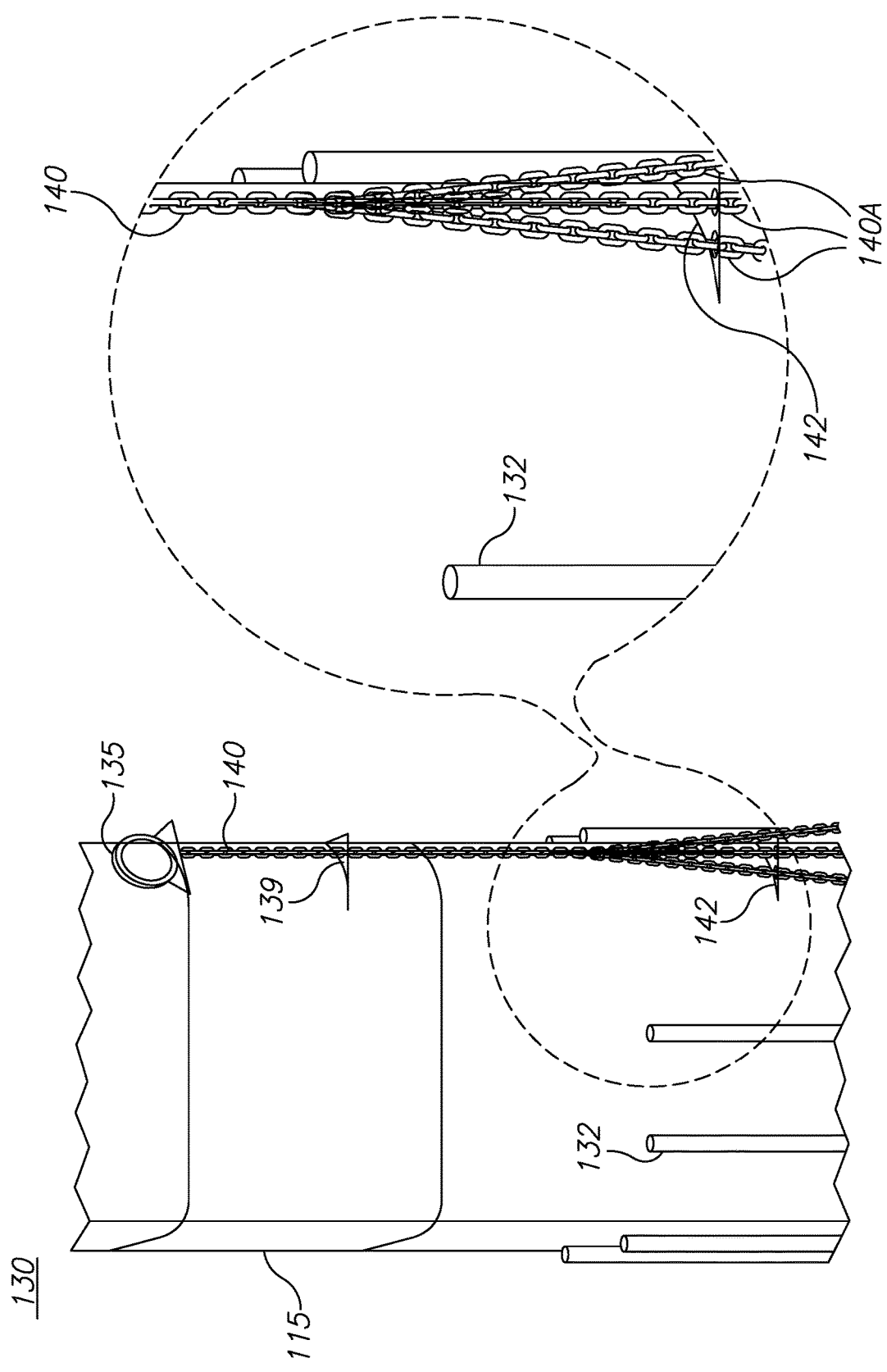
Figure 3G:
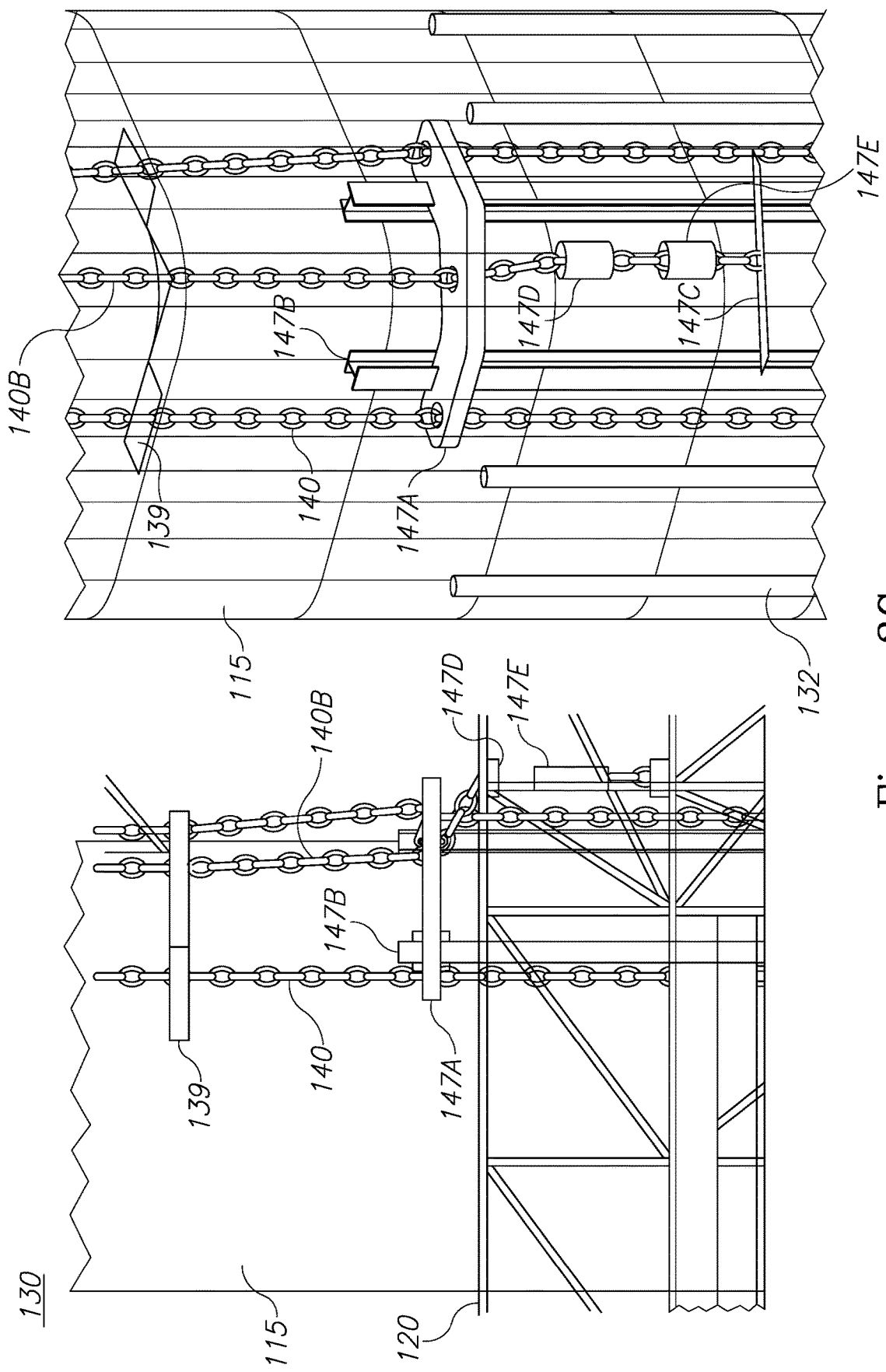
Figure 3H:
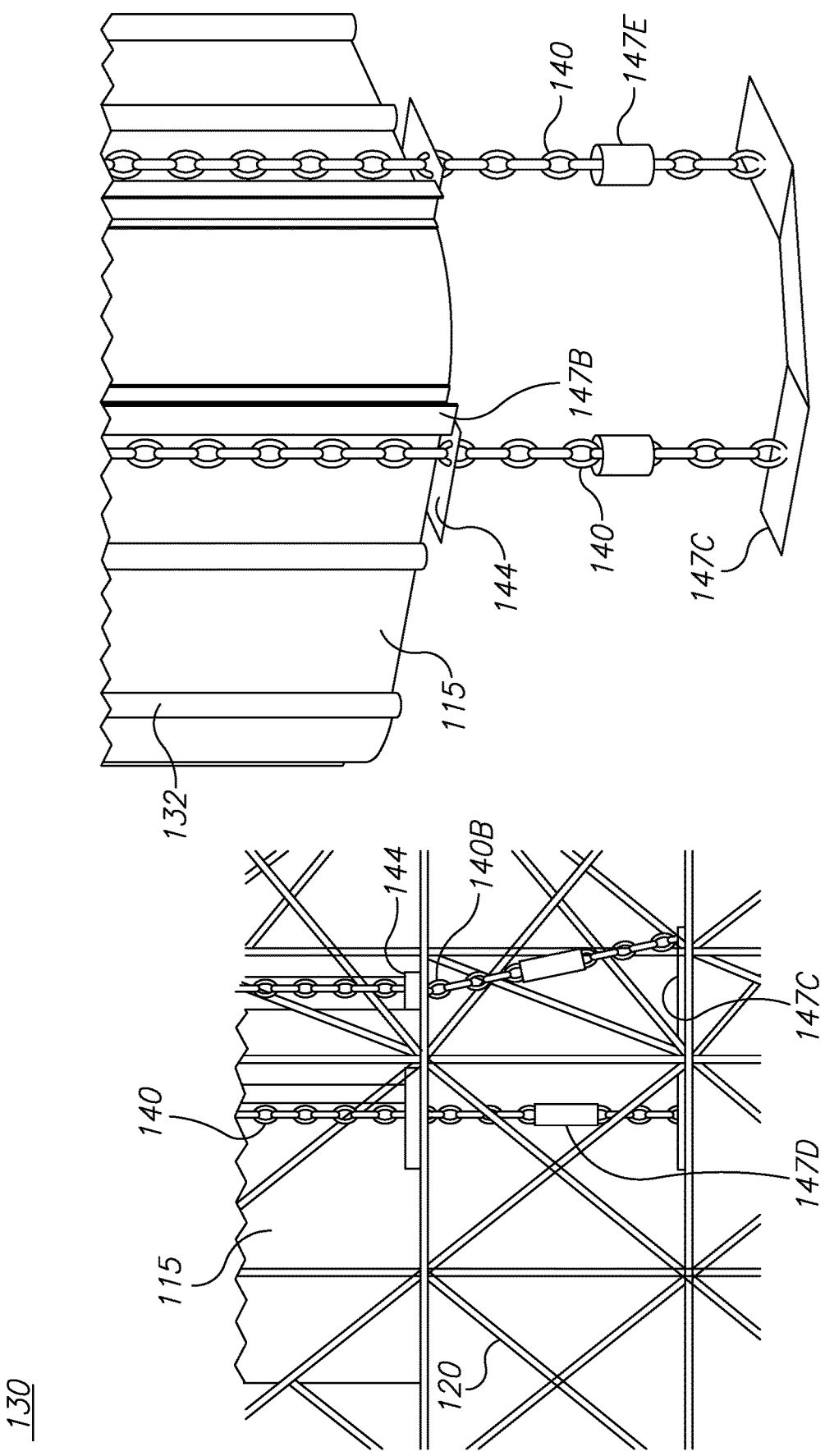
Figure 3I:
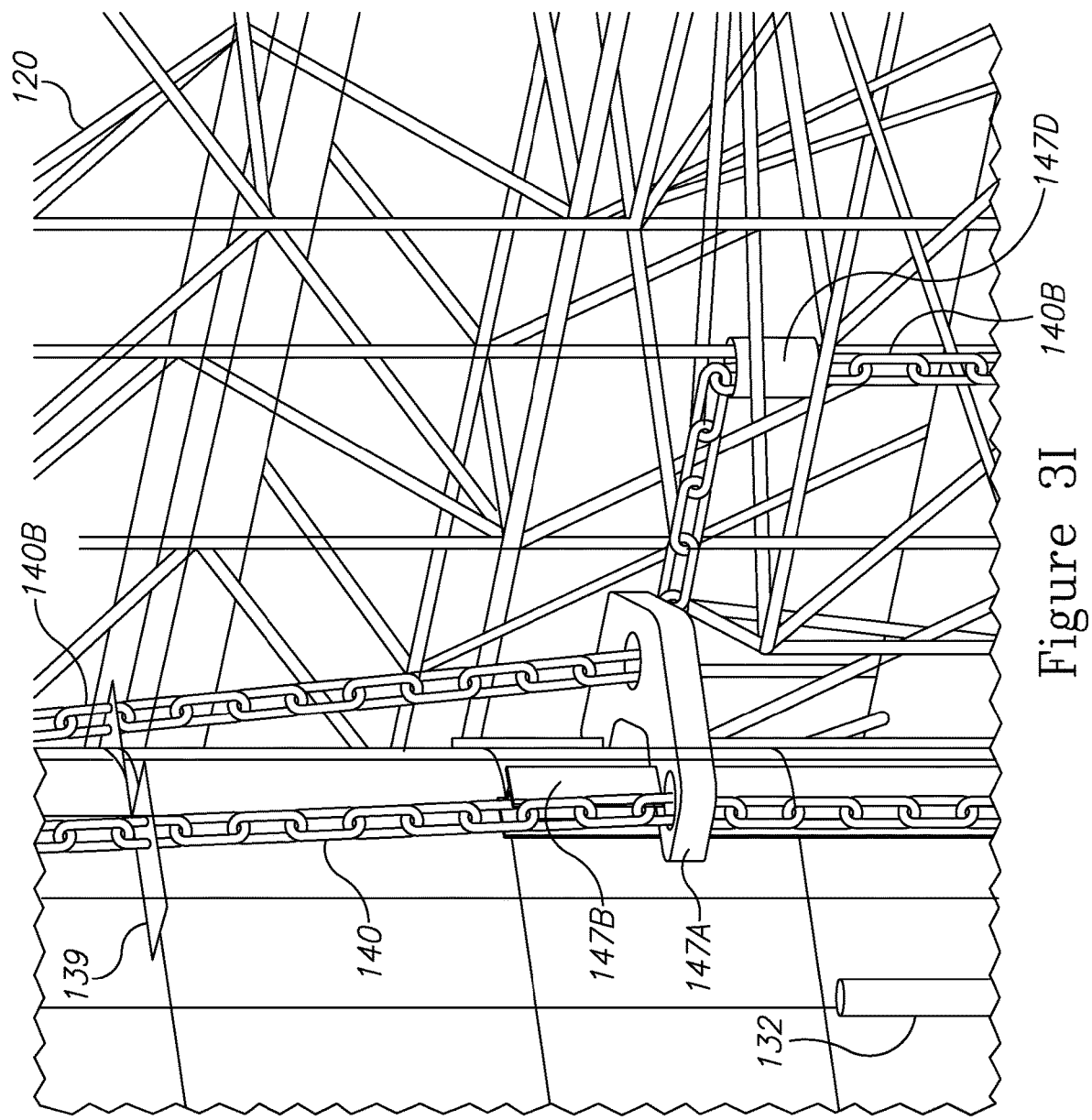
Figure 3J:
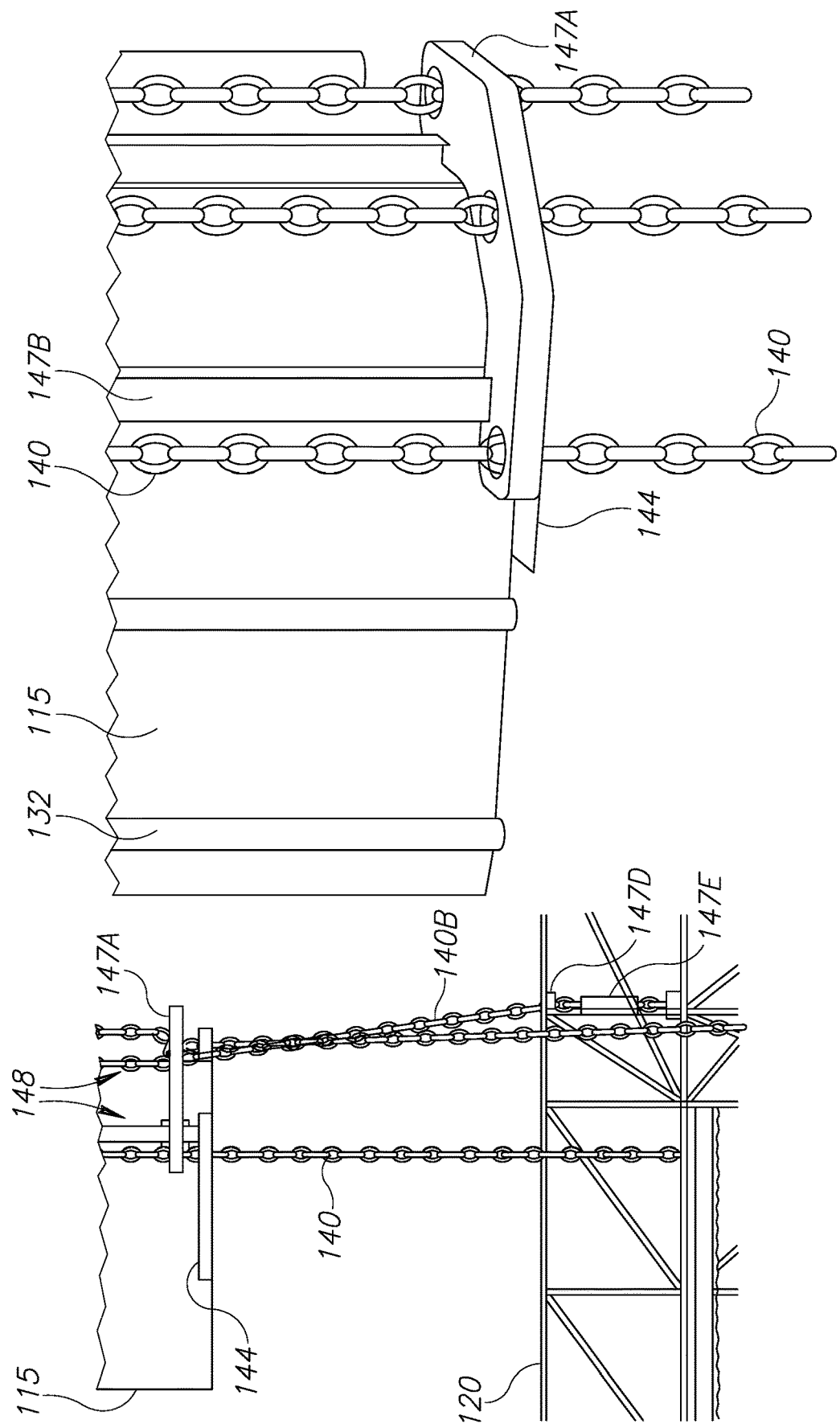

FIG. 3F schematically illustrates usage of multiple chains 140A in mechanical position control mechanism 130, according to some embodiments of the invention. Chains 140 may in some embodiments be split into multiple chains 140A that are anchored on cages 120, raise and lower cages 120 and maintain the relative position of vertical columns 115 in vertical cavities 121. Guides 139, 142 may be configured to guide and control the paths of chains 140A during the operation of system 100.

FIGS. 3G-3J schematically illustrate various elements of mechanical position control mechanism 130, according to some embodiments of the invention. One or more chain assemblies may be positioned at corners of vertical columns 115. FIGS. 3G-3J illustrate as an example such a chain assembly, possibly located along the respective external edge of vertical columns 115. Guides 139, 147A may be configured to guide chains 140 along vertical column 115 and/or to direct one or more chain 140B along a path that distances from vertical column 115 to improve the force application pattern of cages 120, as explained below. Guide 139 may be a fixed top plate guide and guide 147A may be a movable central plate, guided along support(s) 147B. Additional guides 147D may be used to assure correct motion of chain(s) 140B upon raising and lowering cages 120, and supports 147B (e.g., as an I-beam guide) may be provided to mechanically stabilize mechanical position control mechanism 130 and possibly to enable movement of guide 147A along vertical column 115. Shock absorber(s) 147E may be located at different locations (shown as an example close to the connection of chain 140B to member 147C, possibly similar to connection structure 146) to attenuate shocks to mechanical position control mechanism 130. Edge guiding elements 144 may be positioned below movable support 147A and possibly function as a stopper thereto (see FIG. 3J). Movable support 147A may be guided along support(s) 147B by various means. One or more chains 140 may be replaced by rod(s) and/or cable(s) and/or any other tension applying member.

Figure 3K:
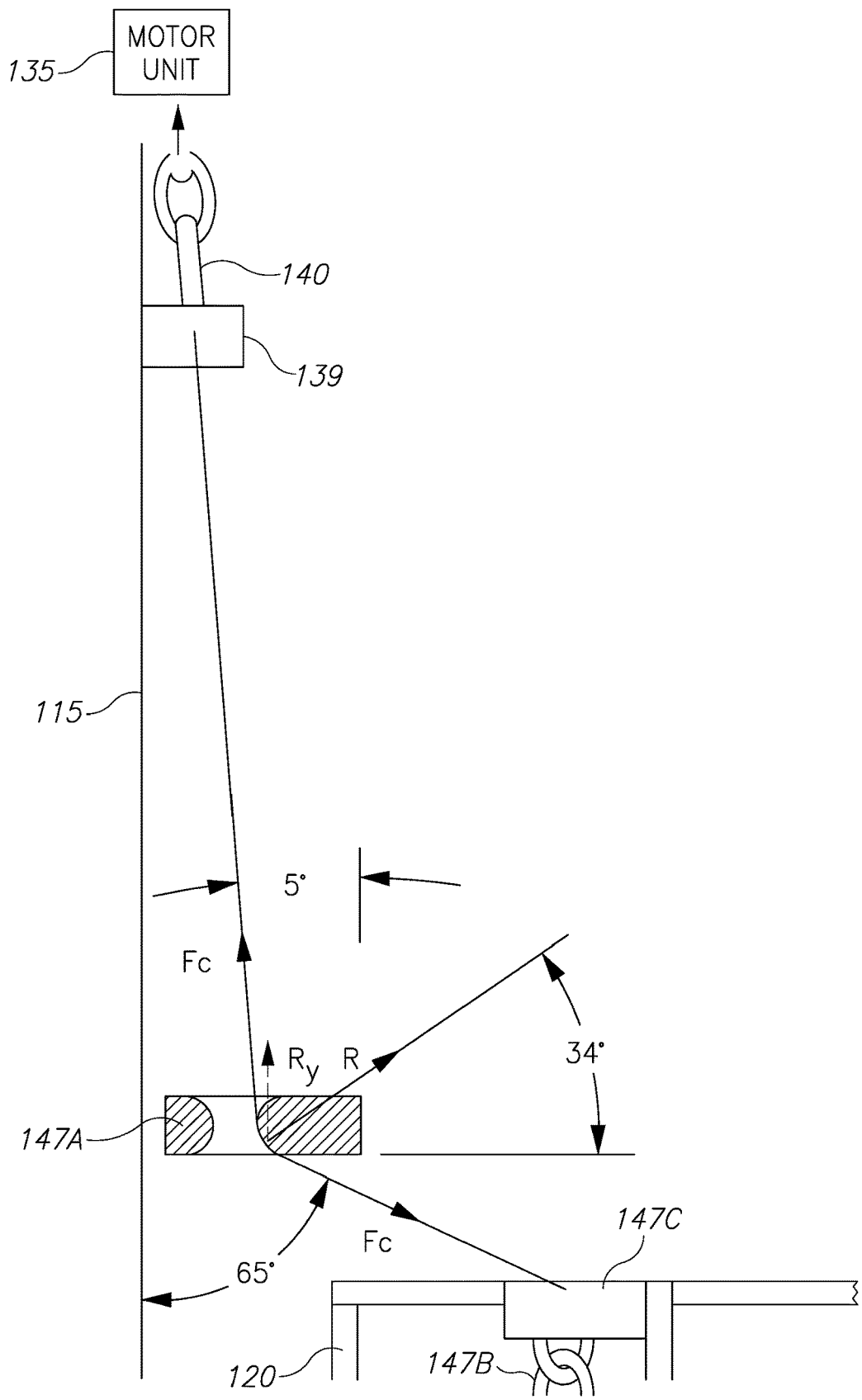

FIG. 3K is a high level schematic example for application of forces on chains 140 by motor unit 135 and by cages 120, according to some embodiments of the invention. Mechanical position control mechanism 130 is configured to raise and lower cages 120 while maintaining a relative position of the chains 140 and minimizing the horizontal movements of cages 120 when guided along vertical columns 115. In particular, mechanical position control mechanism 130 is configured to control and carry out the transitions between raised position 101 and lowered position 102, wherein in the former cages 120 are moved along vertical columns 115 (movement 101A) and in the latter cages 120 are freely connected to vertical columns 115 and may move horizontally below vertical columns 115 without impacting them (movement 102B), as illustrated schematically in FIGS. 2A-2C. During the transition itself, mechanical position control mechanism 130 is configured to apply forces in an accurate manner to engage cages 120 onto columns 115 (102→401) to fit columns 115 into cavities 121 without damaging any of them while applying the immense forces required to carry out this transition. Mechanical position control mechanism 130 is further configured to carry out the opposite transition (101→402) while avoiding damage to cages 120 and columns 115. In exemplary calculations, the force marked $F_c$ in FIG. 3K reaches between 600-1200 tons and the vertical component of the vertical force on movable support 147A may reach 300-700 tons. Mechanical position control mechanism 130 may be configured accordingly to enable the application of such large forces reliably and accurately. It is emphasized that correct angles may be maintained to prevent impacts of cages 120 on columns 115.

Figure 3L:
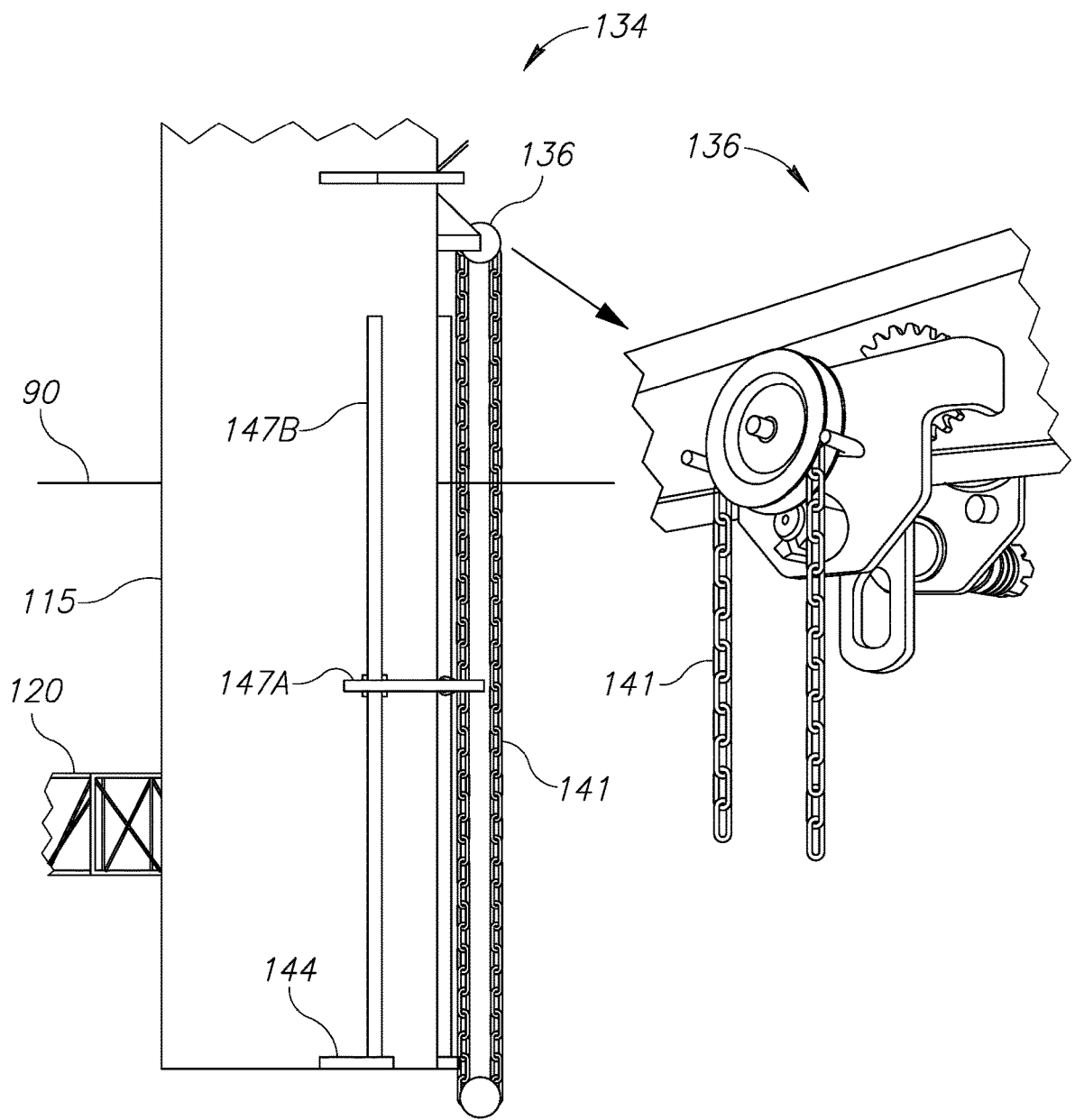

FIG. 3L illustrates schematically a positioning mechanism 134 for controlling the position of movable guide 147A, according to some embodiments of the invention. Illustrated positioning mechanism 134 may be configured to position movable guide 147A at a height which is appropriate to prevent contact between cages 120 and vertical columns 115, as derived e.g., from force calculations illustrated schematically in FIG. 3K above, from realtime measurements, simulations, etc. For example, positioning mechanism 134 may be configured to position movable guide 147A at a constant height above cages 120, i.e., raise movable guide 147A when cages 120 are raised and lower movable guide 147A when cages 120 are lowered. Positioning mechanism 134 may comprise a motor unit 136 (e.g., independent of motor unit 135) and a closed chain loop 141

(as a non-limiting example) to control the height of movable guide 147A along vertical columns 115.

Figure 3M:
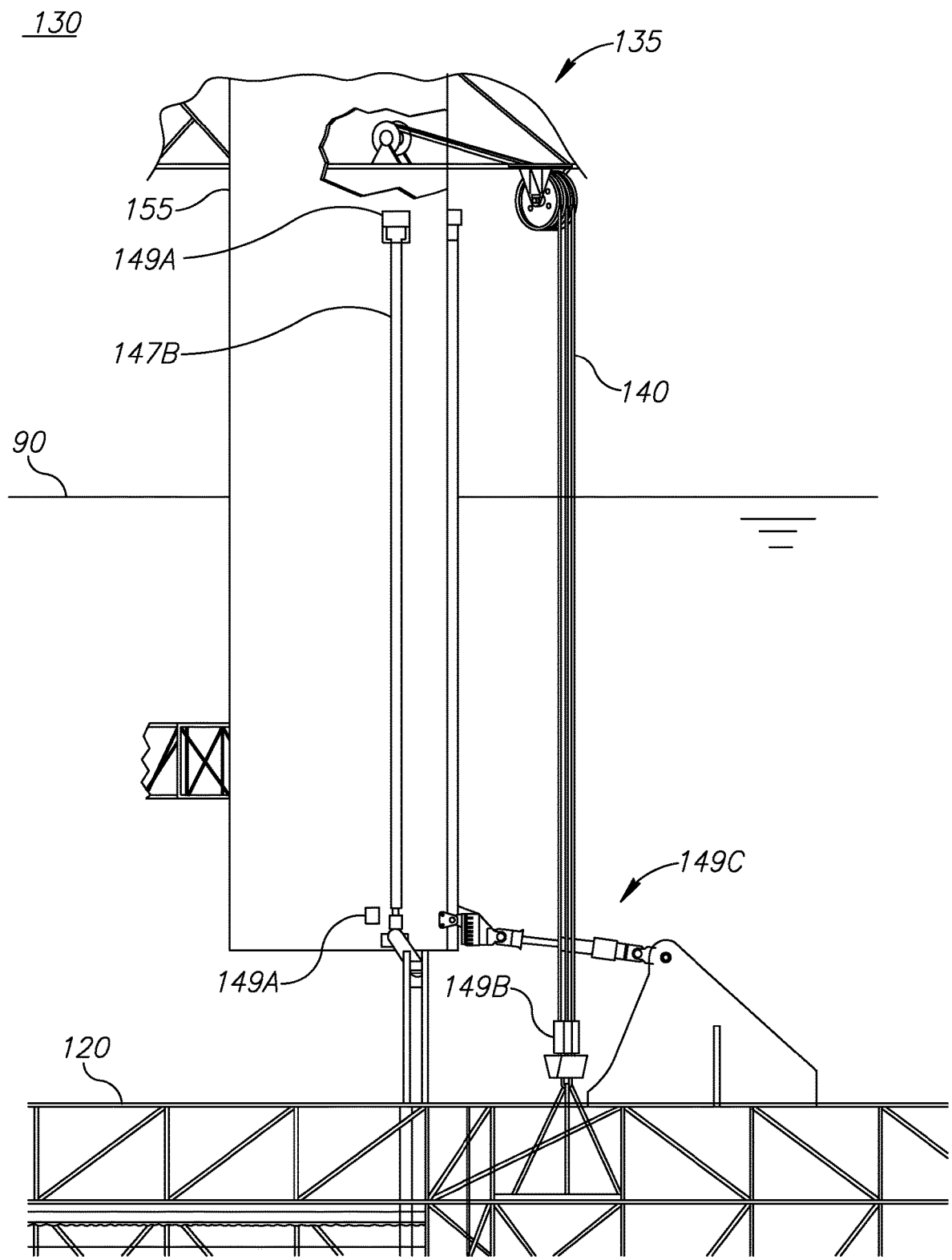
Figure 3N:
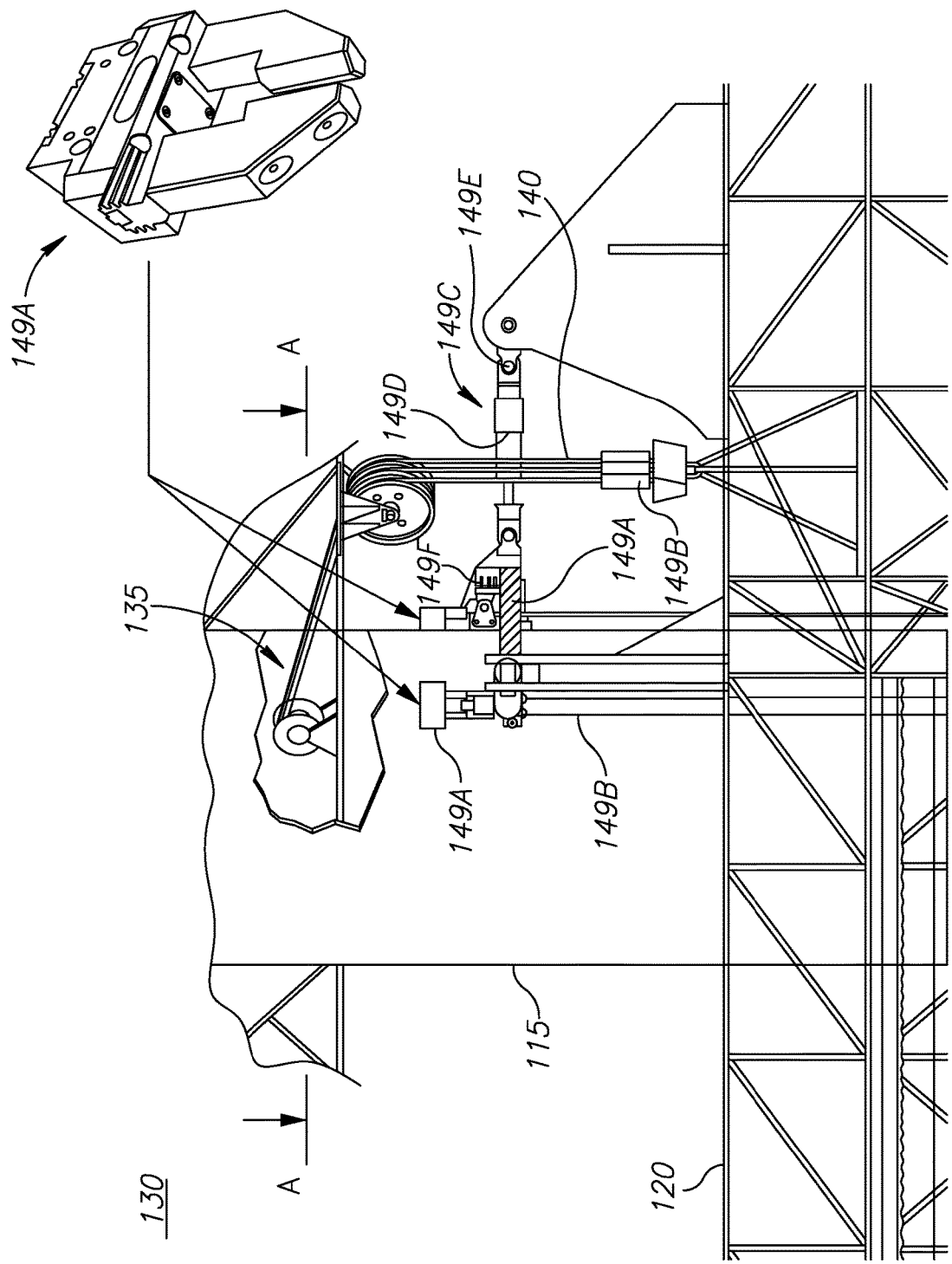
Figure 3N:
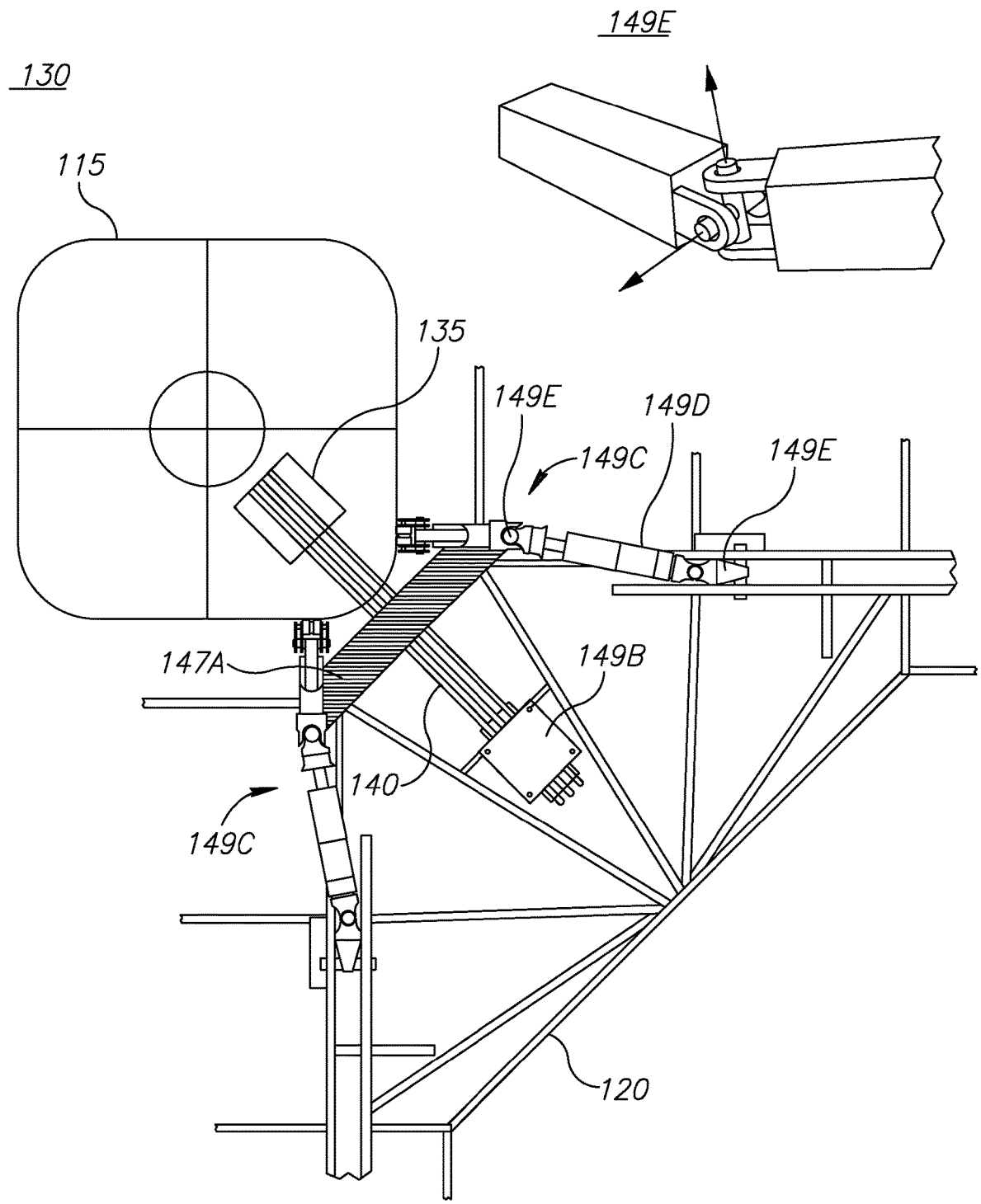
Figure 30:
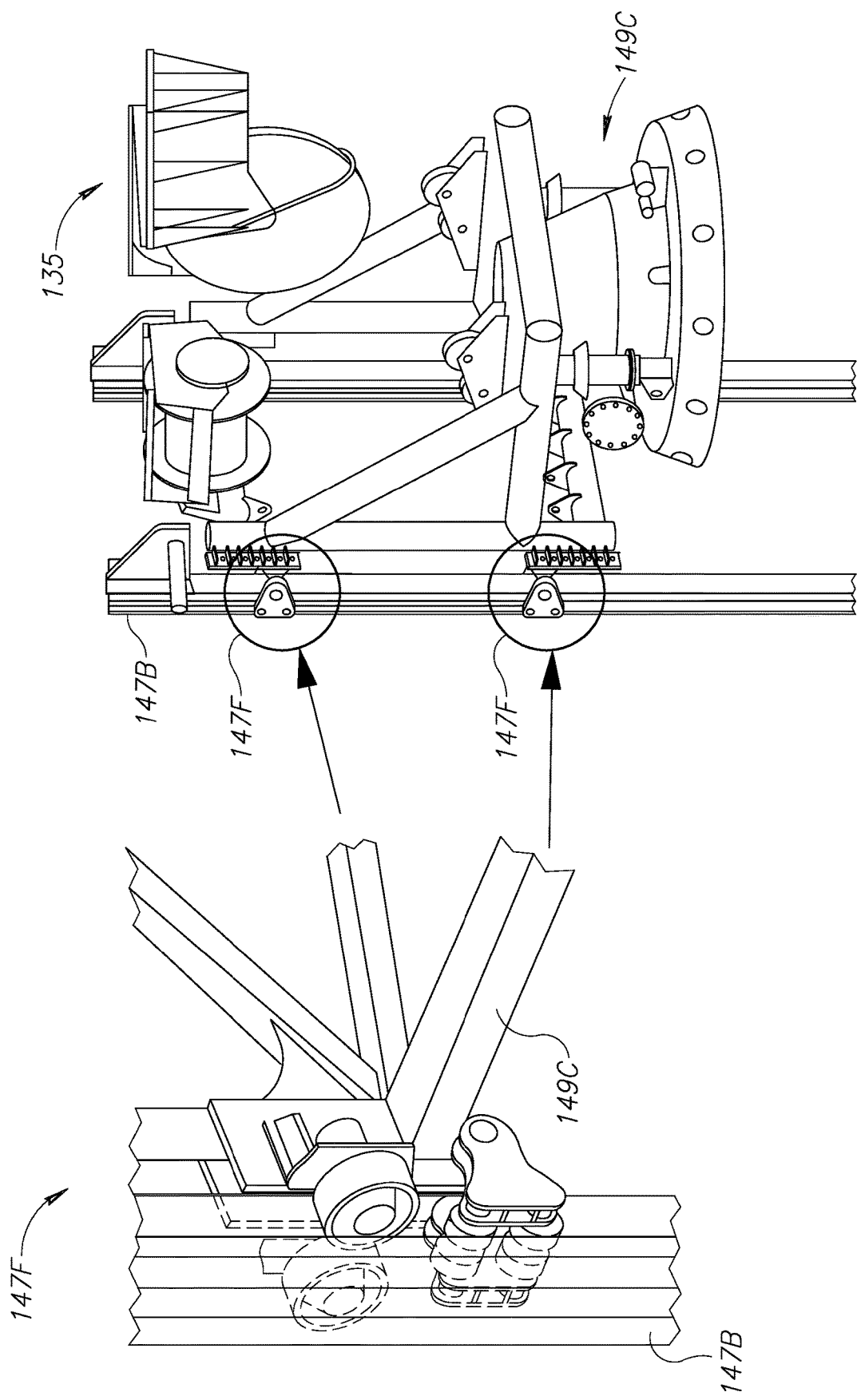

FIGS. 3M-3O schematically illustrate elements of mechanical position control mechanism 130, according to some embodiments of the invention. In some embodiments, mechanical position control mechanism 130 may be configured to use cables 140 (e.g., multi-wire cables), possibly with a sheave system instead or in addition to chains 140. Multiple cables may reduce the force in each cable with respect to $F_c$, using corresponding winches to anchor cables 140 on cages 120, e.g., via heave compensator(s) 149B. Cages 120 may be guided along columns 115 using guides 147B and possibly gripper and/or brakes 149A as movement limiters. Guides 147B may be associated with cages 120 by a movable assembly 149C which may comprise shafts (with radial and/or axial bearing(s)) with shock absorbers 149D (e.g., hydraulic shock absorbers, possibly connected and moved by a chain drive and/or a pulley system, not shown) connected by joints 149E such as universal joints to columns 115 and cages 120. For example, FIG. 3N illustrates schematically a configuration of movable assembly 149C according to certain embodiments of the invention, in side view and in top plan view from the surface marked "A-A". FIG. 3O illustrates schematically an alternative configuration of movable assembly 149C, moved by guides and rollers 147F along guides 147B.

Figure 4C:
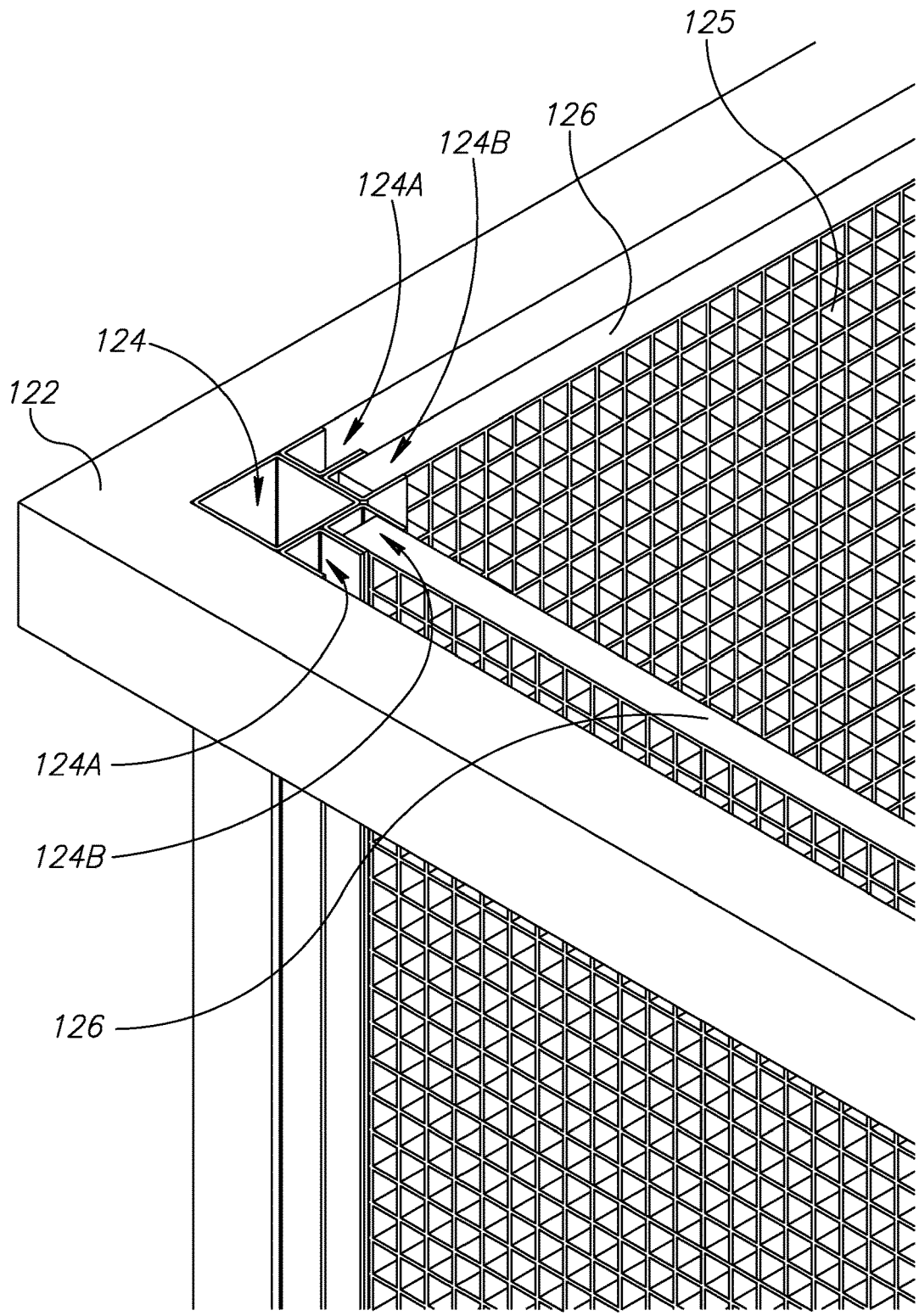
Figure 4D:
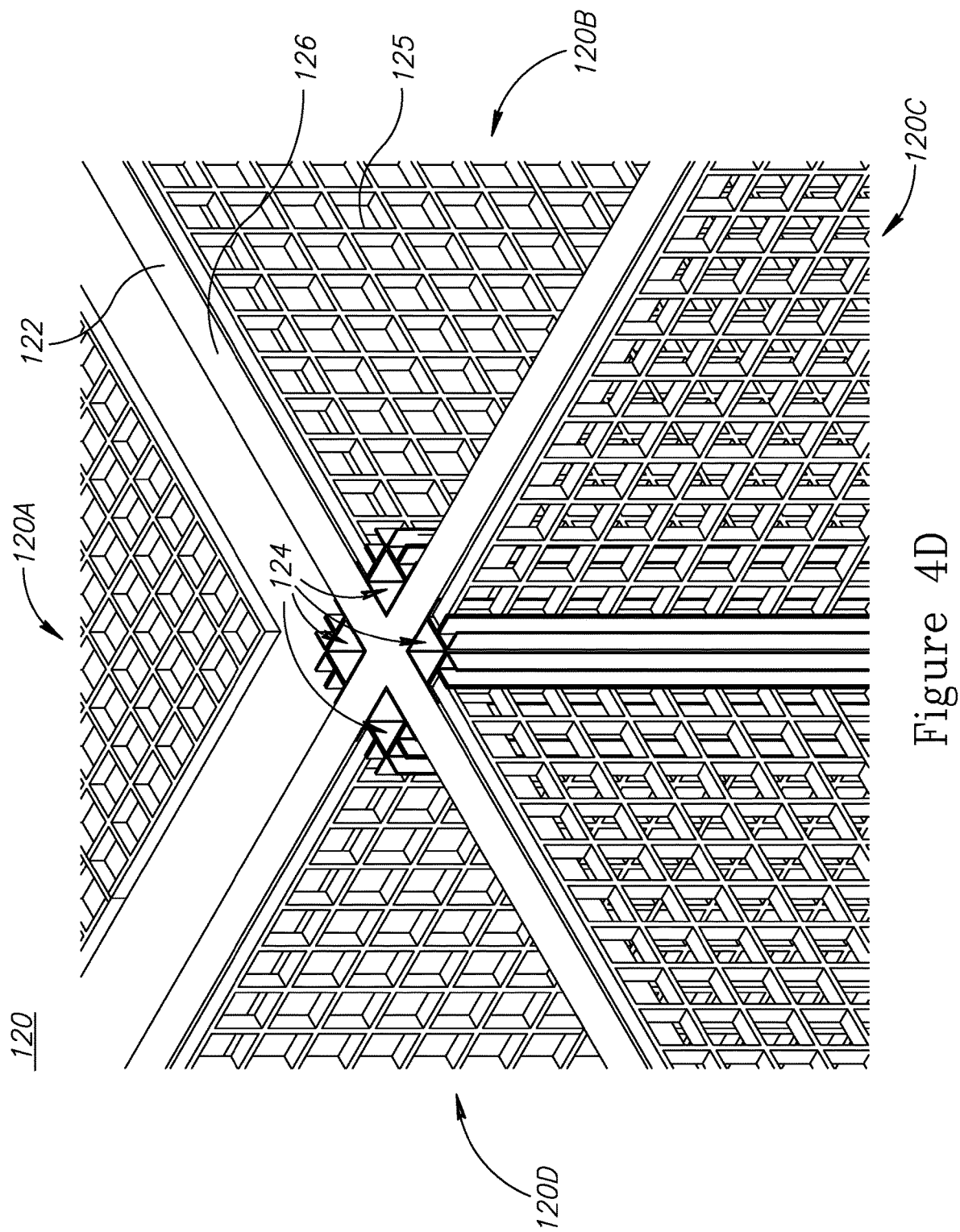

FIGS. 4A-4D are high level schematic illustrations of cage configurations in rigid cage assembly 120, according to some embodiments of the invention. Rigid cage assembly 120 comprises a plurality of cages 120A, 120B, 120C, 120D etc. separated by cage grids 126, which are shown schematically in a non-limiting manner, and may be rigid or at least partially flexible. Rigid cage assembly 120 may comprise a framework 122 with connecting members 124 that provide the backbone of rigid cage assembly 120 (FIG. 4B) as well as multiple rails 124A, 124B configured to receive multiple cage grids 126 that define aquaculture cages 120A, 120B etc. Cage grids 126 may be covered by rigid or flexible nets 125 configured to maintain the animals in aquaculture in the respective cages. A corresponding framework 124 may be configured to support rails 124A, 124B etc., configured to receive cage grids 126, possibly in a modular manner that enables to modify cage volumes according by introducing cage grids 126 into corresponding rails 124A, 124B etc. (FIG. 4C). At least some of rails 124A, 124B may be double rails 124A, 124B, configured to enable replacement of corresponding cage grids 126 without disassembling cages 120A, 120B, 120C, 120D etc., by introducing an additional cage grid 126 before removing former cage grid 126 (FIG. 4D). Note, in FIG. 4C, the empty rails 124A, ready to receive an additional cage grid 126 (not illustrated) if required while maintaining former cage grid 126 (illustrated) in occupied rail 124B. Frameworks 122, 124 may be configured to support mechanically rigid cage assembly 120 and rails 124A, 124B with cage grids 126 upon raising and lowering whole mechanically rigid cage assembly 120 between raised and lowered positions 101, 102, respectively, and during regular offshore operation of open-sea aquaculture system 100. It is noted that rigid cage assembly 120 may be constructed in any way, modular or not modular. It is noted that rails 124A, 124B may be used in certain embodiments of cage assembly 120, while other embodiments may comprise a permanent assembly of some or all of cage grids 126, or assembly of at least some cage grids 126 in a manner different from described above.

Figure 5:
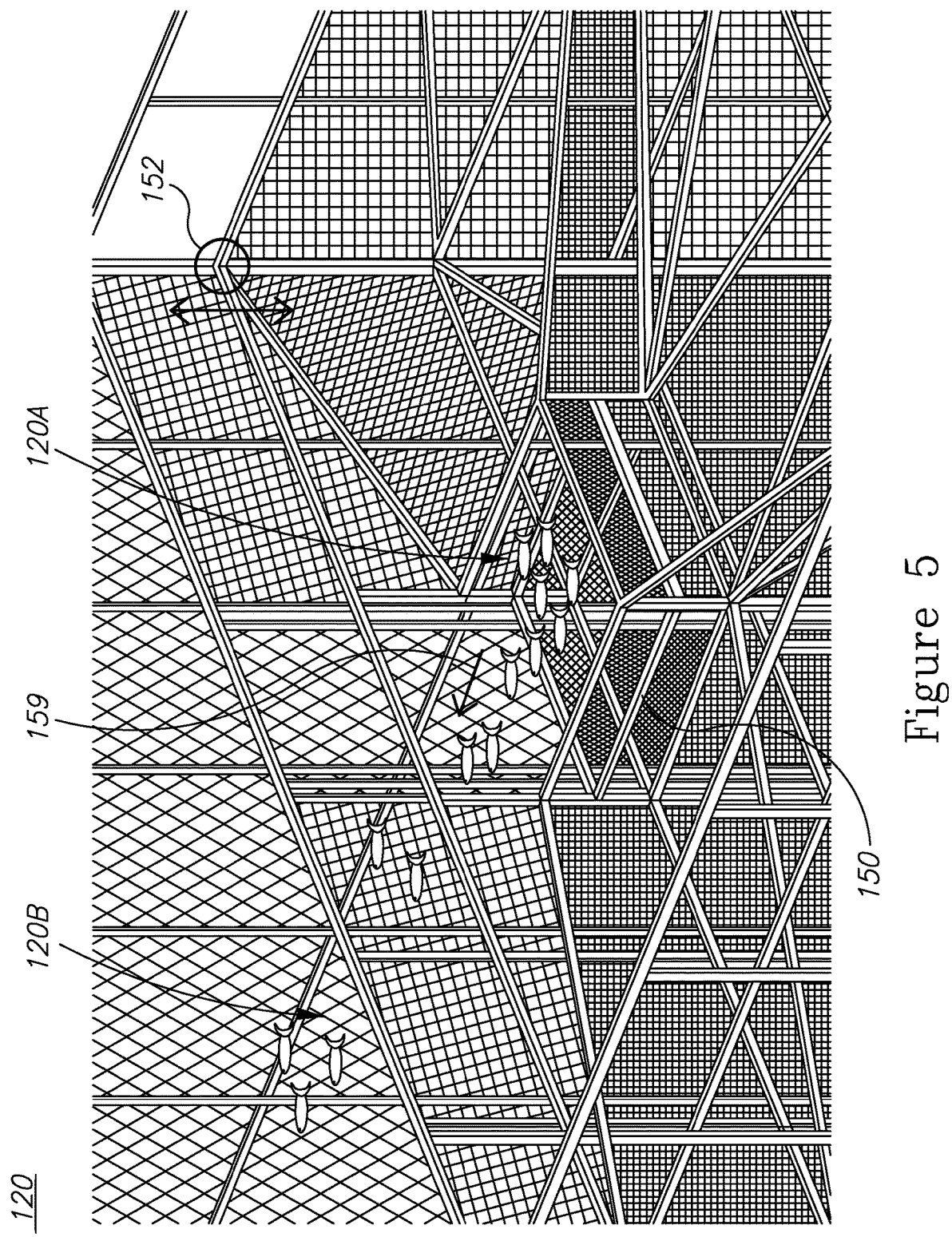
FIG. 5 is a high level schematic illustration of a movable cage floor, used for fish handling in the open-sea aquaculture system, according to some embodiments of the invention.

FIG. 5 is a high level schematic illustration of a movable cage floor 150, used for fish handling in open-sea aquaculture system 100, according to some embodiments of the invention. Rigid cage assembly 120 may be configured to enable volume changes and adaptation in at least some of cages 120. The volume and depth of cages 120 may be adapted according to the specific aquaculture use, i.e., according to specific types of animals grown in the cages, their developmental stages and required conditions (sea conditions, density conditions etc.). Rigid cage assembly 120 may also be configured to enable moving (159) of fish or other types of animals in aquaculture from cage (120A) to cage (120B) to support different growth stages, to enable cage repair if needed, and to harvest the fish in a controlled and safe manner. At least some of aquaculture cages 120A may comprise a vertically movable partition 150 connected by a partition positioning apparatus 152 to cage 120A (e.g., a roller with supporting members) which is possibly controlled by control unit 160). Vertically movable partition 150 may be horizontal or tilted and may have a revolving door mechanism at its bottom. Vertically movable partition 150 may enable moving fish from cage to cage through designated openings (e.g., removable cage grids 126 or cage grid parts). Partition 150 may be moved by motor(s) and chains, possibly in association with mechanical position control mechanisms 130. Movements of partition 150 may be coordinated with movements of rigid cage assembly 120 (e.g., from raised to lowered position 101, 102, respectively) in order to protect the fish and make the change in conditions gradual. For example upon forecasts of rough sea, fish may be lowered within the cages by partition(s) 150, and upon realization of the forecast rigid cage assembly 120 may be lowered while partition(s) 150 may be temporally raised, to allow more time for accommodation of the fish. Eventually, when maximal depth (e.g., in lowered position 102) is required, partition(s) 150 may be lowered even in lowered position 102. Partition(s) 150 may be further used to control the types or sizes of fish within each cage.

Fish may be removed from the cages using various methods, such as suction, pumping, using a crane, using a screw pump, etc. Open-sea aquaculture system 100 may further comprise a sorting system (not shown), arranged to sort fish by size and move them between cages 120A, 120B etc. according to their size as they grow. Maintenance facilities 111 may comprise a computerized center for monitoring the cages and the fish (visually, chemically, and/or using environmental sensors such as oxygen, temperature, salinity sensors, and so forth), for example, measure the biomass of the fish, manage and control the feeding process, detect signs for diseases, and allow the crew to continuously supervise the aquaculture. Offshore open-sea aquaculture system 100 may further comprise facilities 111 that allow the crew to perform maintenance around the clock, with cages below water, including disassembling and replacing parts. Semisubmersible platform 110 may comprise ship mooring facilities allowing for supplies and fish transport, and helicopter landing gear.

Figure 6:
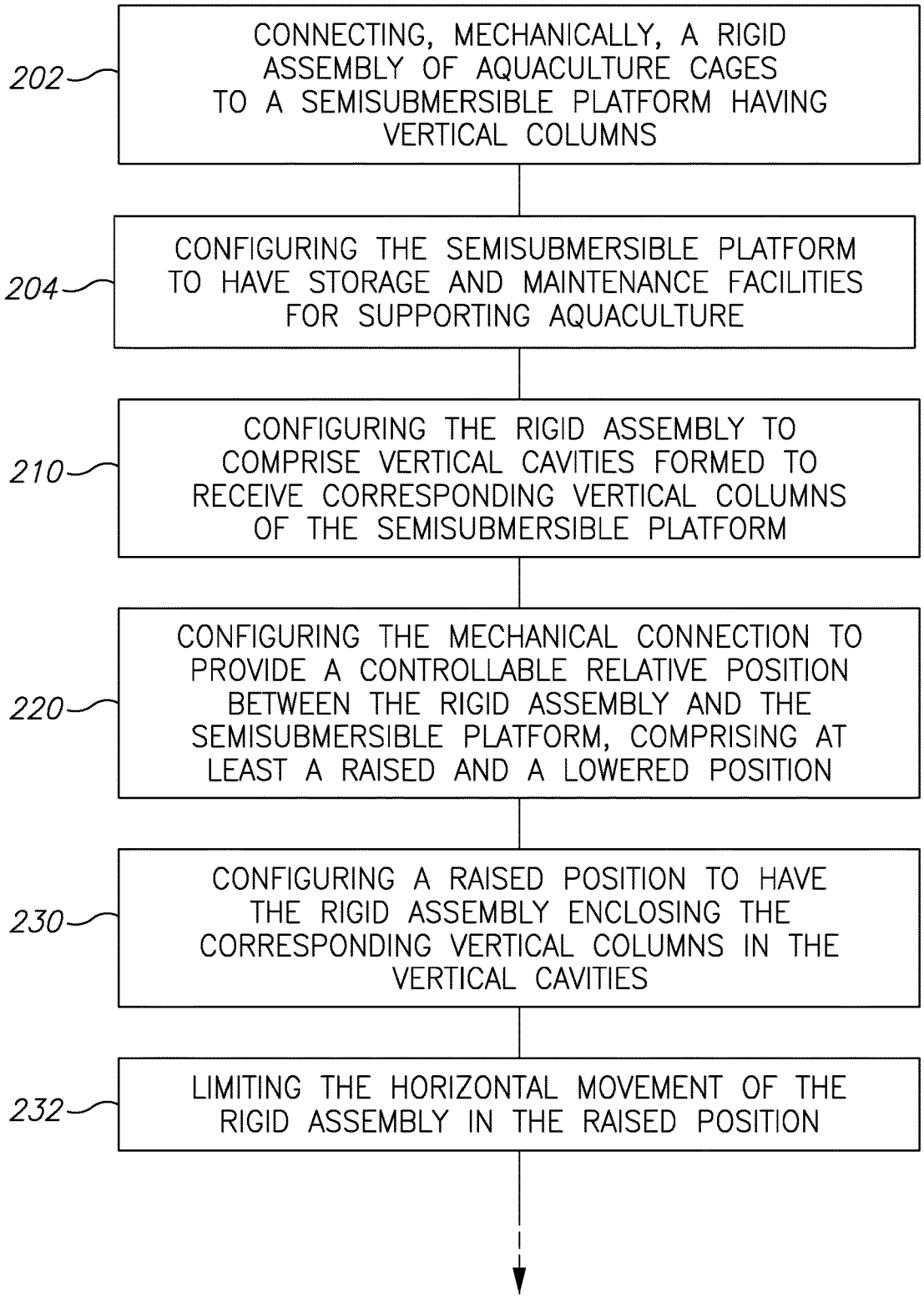
FIG. 6 is a high level flowchart illustrating an open-sea aquaculture method, according to some embodiments of the invention.

FIG. 6 is a high level flowchart illustrating an open-sea aquaculture method 200, according to some embodiments of the invention. Method 200 may be implemented by system 100 and system may be configured to operate method 200. Some of the listed stages are optional, and the order of the stages may be changed according to operational considerations.

Method 200 comprises connecting, mechanically, a rigid assembly of aquaculture cages to a semisubmersible platform which comprises a plurality of vertical columns (stage 202), the semisubmersible platform configured to have storage and maintenance facilities for supporting aquaculture (stage 204). The rigid assembly is configured to comprise a plurality of vertical cavities formed to receive corresponding vertical columns of the semisubmersible platform (stage 210).

Method 200 further comprises configuring the mechanical connection to provide a controllable relative position between the rigid assembly and the semisubmersible platform, comprising at least two operational positions (stage 220): a raised position configured to have the rigid assembly enclose the corresponding vertical columns in the vertical cavities (stage 230) to limit a horizontal movement of the rigid assembly (stage 232) while possibly enabling vertical positional adjustment in the raised position (stage 235), and a lowered position configured to have the rigid assembly below the corresponding vertical columns (stage 240), possibly allowing some horizontal and vertical movement of the rigid assembly in the lowered position (stage 245).

Method 200 further comprises controlling the relative position between the rigid assembly and the semisubmersible platform (stage 250) to move the rigid assembly from the raised to the lowered position upon occurrence of specified rough sea conditions, or at any other time as needed and to move the rigid assembly from the lowered to the raised position upon specified conditions (stage 260) and moving the rigid assembly from the lowered to the raised position upon specified conditions such as calm sea (stage 270).

Method 200 may further comprise guiding top openings of the vertical cavities of the rigid assembly toward bottoms of the corresponding vertical columns of the semisubmersible platform, upon raising the rigid assembly from the lowered to the raised position (stage 280).

Method 200 may further comprise configuring the mechanical connection to comprise a plurality of chains connecting the rigid assembly to at least one motor unit on the platform (stage 290), and configuring the at least one motor unit to controllably release and collect the chains (stage 295).

Method 200 may further comprise connecting the chains to the rigid assembly at a corresponding plurality of attachment positions which are selected to position top openings of the vertical cavities of the rigid assembly against bottoms of the corresponding vertical columns of the semisubmersible platform, upon raising the rigid assembly from the lowered to the raised position by pulling of the chains by the at least one motor unit (stage 300).

Method 200 may further comprise guiding the chains along at least lower sections of the corresponding vertical columns of the semisubmersible platform (stage 305).

In certain embodiments, method 200 may further comprise configuring the rigid assembly to have a plurality of rails configured to receive a plurality of cage grids that define the aquaculture cages (stage 310). Method 200 may further comprise configuring at least some of the rails as double rails that enable replacement of corresponding cage grids without disassembling the cages (stage 315). Using rails is an optional feature, and method 200 may be carried out without stages 310 and 315. Method 200 may further comprise configuring and using vertically movable partitions in at least some of the aquaculture cages to control cage volume, to move fish from cage to cage and/or to remove fish from the cages (stage 320).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. An open-sea aquaculture system comprising:
   a semisubmersible platform having storage and maintenance facilities for supporting aquaculture, the semisubmersible platform comprising and being buoyant by a plurality of vertical columns, which are partly below an ocean surface , and at least one motor unit,
   a rigid assembly of aquaculture cages, the rigid assembly comprising a plurality of vertical cavities having forms configured to receive corresponding vertical columns of the semisubmersible platform,
   a mechanical position control mechanism comprising a plurality of tension applying members configured to connect, mechanically, the rigid assembly to the at least one motor unit on the semisubmersible platform and to control a relative position therebetween to provide at least two operational positions:
      a raised position in which the rigid assembly encloses the corresponding vertical columns in the vertical cavities, and
      a lowered position in which the rigid assembly is below the corresponding vertical columns, and
   a control unit configured to control the mechanical position control mechanism and the at least one motor unit to move the rigid assembly from the raised to the lowered position upon occurrence of specified conditions, and to move the rigid assembly from the lowered to the raised position upon specified conditions, and
   a guiding construction, configured to guide top openings of the vertical cavities of the rigid assembly toward bottoms of the corresponding vertical columns of the semisubmersible platform, upon raising the rigid assembly from the lowered to the raised position,
   wherein the guiding construction comprises multiple members, arranged geometrically and with respect to applied forces in a way that brings the top openings of the vertical cavities into a correct position below the bottoms of the corresponding vertical columns upon pulling the tension applying members upwards by the at least one motor unit.

2. The open-sea aquaculture system of claim 1, wherein one or more of the plurality of tension applying members comprise: chains, rods, or cables.

3. The open-sea aquaculture system of claim 2, wherein the tension applying members are connected to the rigid assembly at a corresponding plurality of attachment positions which are selected to position top openings of the vertical cavities of the rigid assembly against bottoms of the corresponding vertical columns of the semisubmersible platform, upon raising the rigid assembly from the lowered to the raised position by pulling of the tension applying members by the at least one motor unit.

4. The open-sea aquaculture system of claim 2, wherein the tension applying members are guided along at least lower sections of the corresponding vertical columns of the semisubmersible platform.

5. The open-sea aquaculture system of claim 1, wherein the rigid assembly comprises a plurality of rails configured to receive a plurality of cage grids that define the aquaculture cages.

6. The open-sea aquaculture system of claim 5, wherein at least some of the rails are double rails configured to enable replacement of corresponding cage grids without disassembling the cages.

7. The open-sea aquaculture system of claim 1, wherein at least some of the aquaculture cages comprise a vertically movable partition connected by a partition positioning apparatus to the cage and controlled by the control unit.

8. The open-sea aquaculture system of claim 1, wherein the rigid assembly comprises a buoyancy mechanism, which is controlled by the control unit.

9. An open-sea aquaculture method comprising:
connecting, mechanically, a rigid assembly of aquaculture cages to at least one motor unit on a semisubmersible platform using a plurality of tension applying members, the semisubmersible platform having storage and maintenance facilities for supporting aquaculture, and comprising and being buoyant by a plurality of vertical columns which are partly below an ocean surface, and at least one motor unit,
wherein the rigid assembly is configured to comprise a plurality of vertical cavities formed to receive corresponding vertical columns of the semisubmersible platform,
configuring the mechanical connection to provide a controllable relative position between the rigid assembly and the semisubmersible platform, comprising at least two operational positions:
a raised position in which the rigid assembly encloses the corresponding vertical columns in the vertical cavities, and,
a lowered position in which the rigid assembly is below the corresponding vertical columns,
controlling the relative position between the rigid assembly and the semisubmersible platform to move the rigid assembly from the raised to the lowered position upon occurrence of specified conditions, and to move the rigid assembly from the lowered to the raised position upon specified conditions, and
guiding top openings of the vertical cavities of the rigid assembly toward bottoms of the corresponding vertical columns of the semisubmersible platform, upon raising the rigid assembly from the lowered to the raised position,
wherein the guiding is carried out using multiple members, arranged geometrically and with respect to applied forces in a way that brings the top openings of the vertical cavities into a correct position below the bottoms of the corresponding vertical columns upon pulling the tension applying members upwards by the at least one motor unit.

10. The open-sea aquaculture method of claim 9, wherein one or more of the plurality of tension applying members comprise: chains, rods, or cables.

11. The open-sea aquaculture method of claim 10, further comprising connecting the tension applying members to the rigid assembly at a corresponding plurality of attachment positions which are selected to position top openings of the vertical cavities of the rigid assembly against bottoms of the corresponding vertical columns of the semisubmersible platform, upon raising the rigid assembly from the lowered to the raised position by pulling of the tension applying members by the at least one motor unit.

12. The open-sea aquaculture method of claim 10, further comprising guiding the tension applying members along at least lower sections of the corresponding vertical columns of the semisubmersible platform.

13. The open-sea aquaculture method of claim 9, further comprising configuring the rigid assembly to have a plurality of rails configured to receive a plurality of cage grids that define the aquaculture cages.

14. The open-sea aquaculture method of claim 13, further comprising configuring at least some of the rails as double rails that enable replacement of corresponding cage grids without disassembling the cages.

15. The open-sea aquaculture method of claim 9, further comprising configuring vertically movable partitions in at least some of the aquaculture cages to control cage volume.

* * * * *